(12) United States Patent
Odagawa et al.

(10) Patent No.: US 7,228,229 B2
(45) Date of Patent: Jun. 5, 2007

(54) INFORMATION PROCESSING DEVICE AND TRAVEL INFORMATION VOICE GUIDANCE METHOD

(75) Inventors: Satoshi Odagawa, Tsurugashima (JP); Shinichi Gayama, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 75 days.

(21) Appl. No.: 11/003,329

(22) Filed: Dec. 6, 2004

(65) Prior Publication Data

US 2005/0143915 A1    Jun. 30, 2005

(30) Foreign Application Priority Data

Dec. 8, 2003    (JP)    ............................ P2003-408726

(51) Int. Cl.
*G01C 21/36*    (2006.01)
*G08G 1/0962*    (2006.01)

(52) U.S. Cl. ..................................... 701/211
(58) Field of Classification Search ..................... None
See application file for complete search history.

(56) References Cited

U.S. PATENT DOCUMENTS

| | | | |
|---|---|---|---|
| 5,101,357 A | | 3/1992 | Tempelhof |
| 5,177,685 A | * | 1/1993 | Davis et al. ............. 455/456.5 |
| 5,790,975 A | | 8/1998 | Kashiwazaki et al. |
| 6,208,932 B1 | * | 3/2001 | Ohmura et al. ............. 701/200 |
| 6,266,614 B1 | * | 7/2001 | Alumbaugh ................ 701/211 |
| 6,957,128 B1 | * | 10/2005 | Ito et al. ........................ 701/1 |
| 2005/0100180 A1 | * | 5/2005 | Nakamura ................... 381/110 |

FOREIGN PATENT DOCUMENTS

| | | | |
|---|---|---|---|
| DE | 199 46 022 A1 | | 4/2001 |
| JP | 10-104010 | | 4/1998 |
| JP | 2001-116581 | * | 4/2001 |
| JP | 2002-247699 | | 8/2002 |
| JP | 2002-352865 | | 12/2002 |
| JP | 2004-108908 | * | 4/2004 |
| JP | 2004-117176 | | 4/2004 |
| WO | WO 01/54950 A1 | | 8/2001 |

* cited by examiner

*Primary Examiner*—Michael J. Zanelli
(74) *Attorney, Agent, or Firm*—Drinker Biddle & Reath LLP

(57) ABSTRACT

An information processing device and travel information voice guidance method for moving objects, capable of reliably providing travel information through voice guidance while avoiding insofar as possible the interruption of the user's enjoyment of music during music playback, comprising a song playback portion which outputs song audio signals representing song sounds; a travel information generation portion which generates travel information; a song playback judgment portion which judges whether, when travel information is generated, the song playback portion is outputting song audio signals; and voice guidance output portion which, when it is judged that song audio signals are being output, gives priority to output of voice guidance audio signals representing the above travel information over the above song audio signals, according to at least either one of the urgency of the above generated travel information, and the type of musical phrase in the song for which the above song audio signals are currently being output.

29 Claims, 29 Drawing Sheets

FIG. 17

| GENERATION OR RECEPTION | HIGH-URGENCY TRAVEL INFORMATION | INTERMEDIATE-URGENCY TRAVEL INFORMATION | LOW-URGENCY TRAVEL INFORMATION |
|---|---|---|---|
| NAVIGATION SYSTEM ITSELF | "TURN RIGHT AT NEXT INTERSECTION" "TURN LEFT AT THIS INTERSECTION" "EXIT THE HIGHWAY AT THIS OFF-RAMP" | "TURN LEFT AT XX INTERSECTION YY KM AHEAD" "CHANGE TO LEFT LANE" "HIGHWAY OFF-RAMP 1 KM AHEAD" | "CONGESTION XX KM AHEAD" "CHECK YOUR HEADLIGHTS" "PERHAPS YOU SHOULD TAKE A BREAK" |
| BEACON | "NO LEFT TURNS AT NEXT INTERSECTION DUE TO CONSTRUCTION" | "BROKEN DOWN CAR XX M AHEAD" | "30 MINUTES TO KASUMIGASEKI" "THUNDERSTORMS EXPECTED IN THE EVENING" |
| WIRELESS LAN | "A FIRE HAS OCCURRED UP AHEAD" | "CONGESTION NEAR XX DEPARTMENT STORE" | "TOMORROW THIS AREA WILL BE OFF-LIMITS DUE TO A FESTIVAL" |
| BROADCAST RADIO WAVES | "AN EARTHQUAKE HAS OCCURRED IN THE KANTO AREA" | "HIGHWAY ON-RAMP CLOSED" | "WEATHER IN SOUTHERN SAITAMA TOMORROW SHOULD BE NICE" |

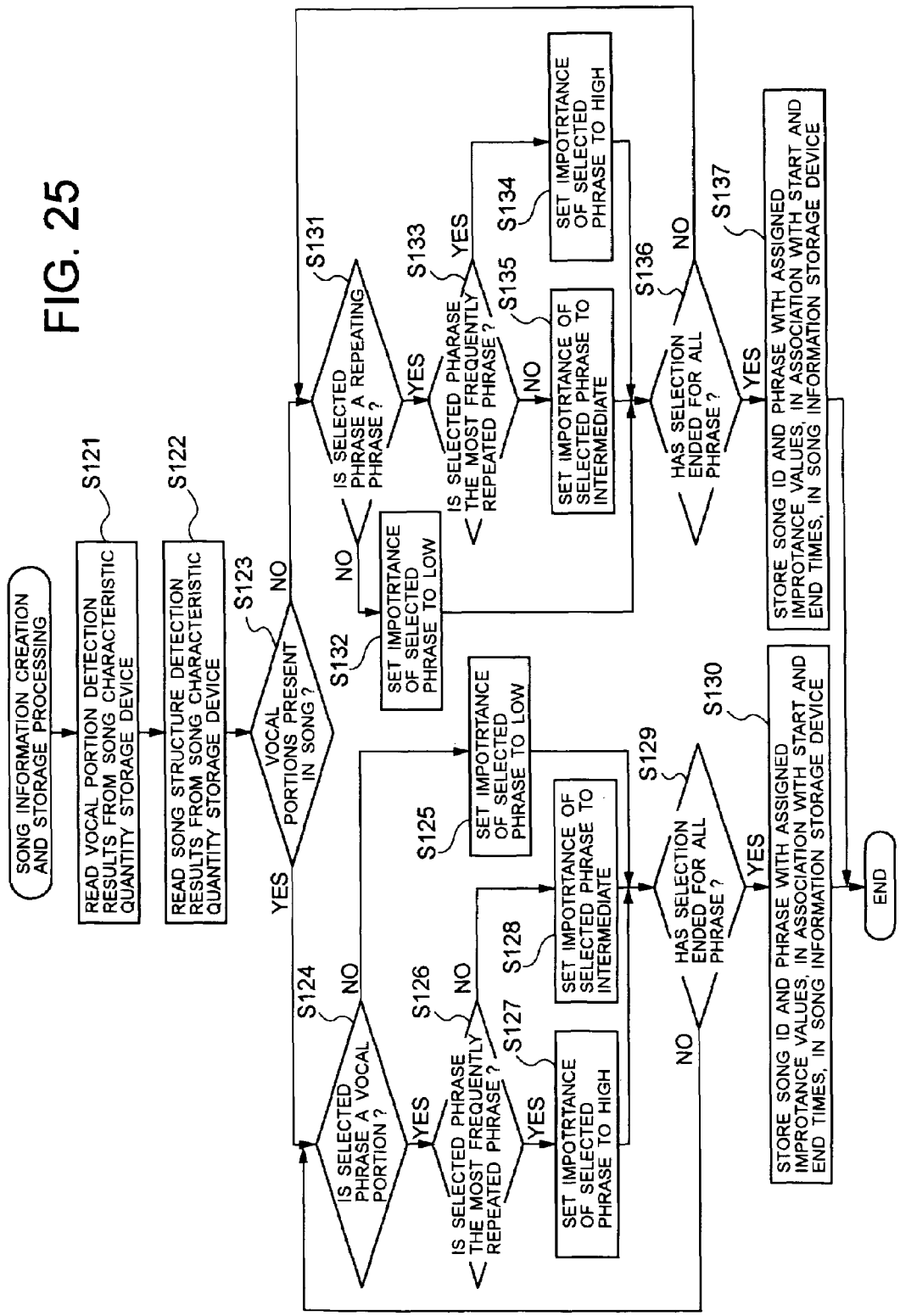

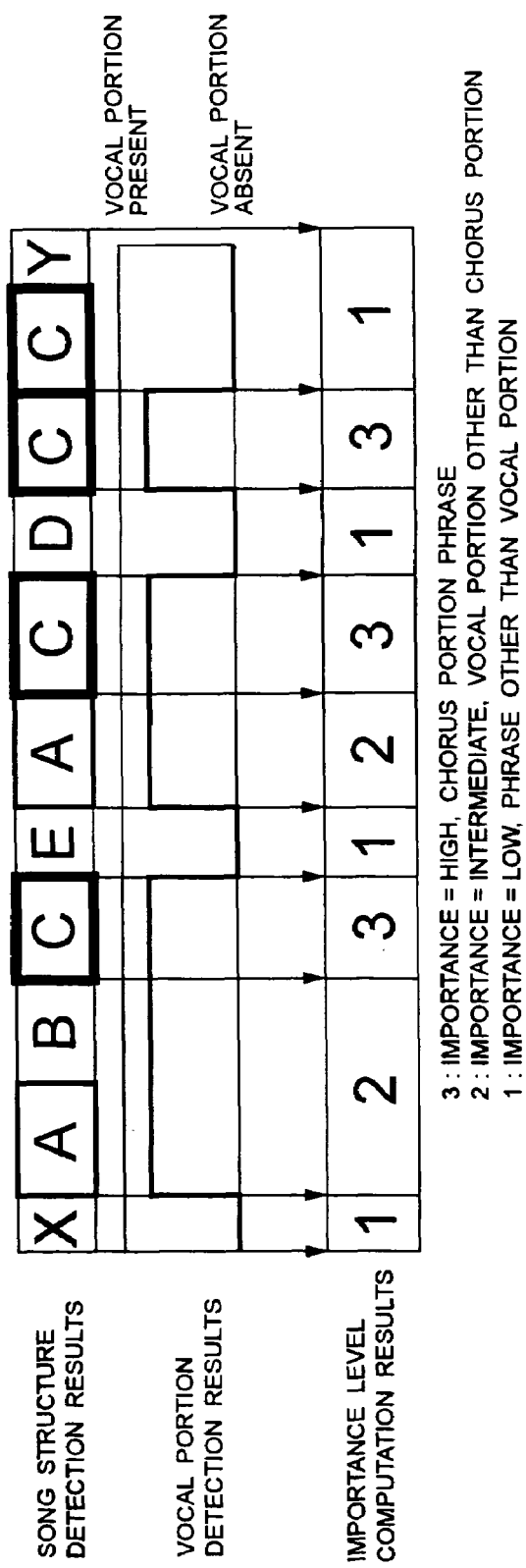

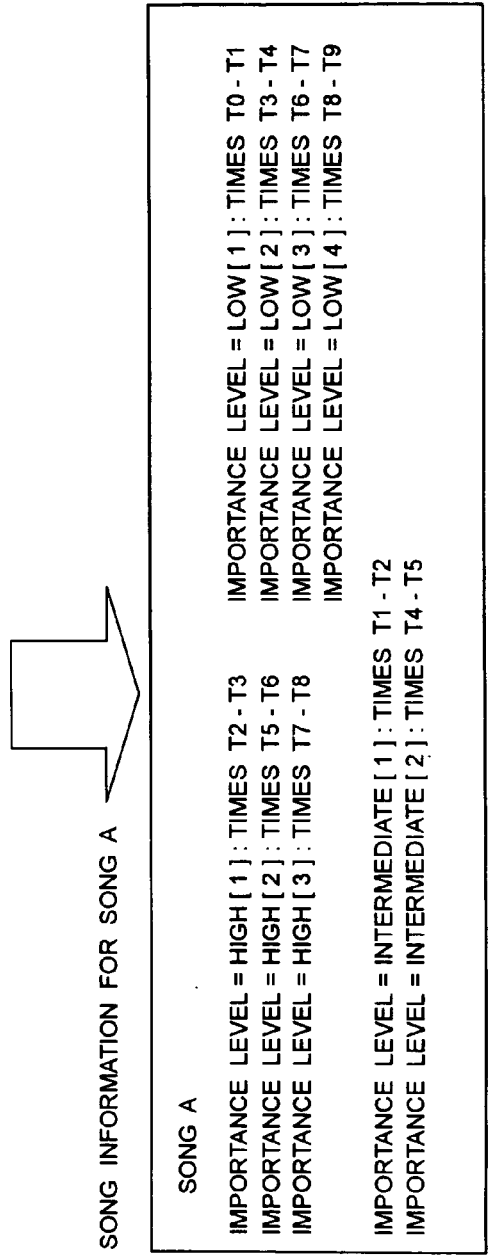

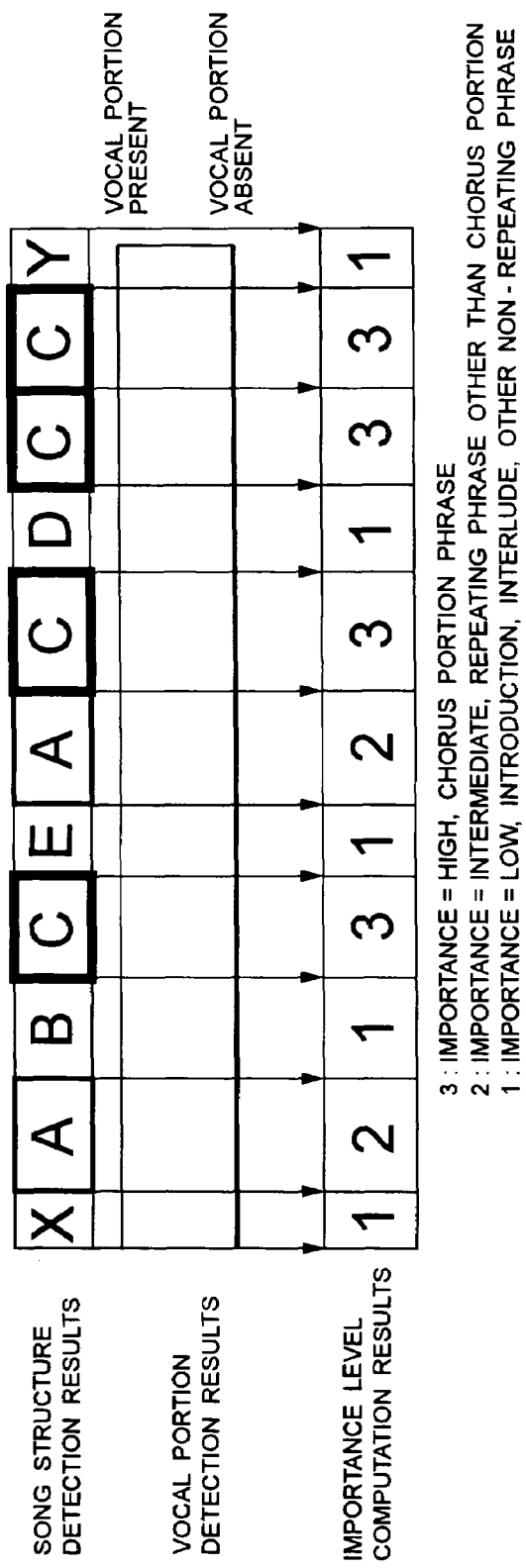

FIG. 29

IMPORTANCE LEVEL COMPUTATION
RESULTS FOR SONG A

| 1 | 2 | 1 | 3 | 1 | 2 | 3 | 1 | 3 | 3 | 1 |
|---|---|---|---|---|---|---|---|---|---|---|

TIME T0 T1 T2 T3 T4 T5 T6 T7 T8 T9 T10 T11

3 : IMPORTANCE = HIGH, CHORUS PORTION PHRASE
2 : IMPORTANCE = INTERMEDIATE, REPEATING PHRASE OTHER THAN CHORUS PORTION
1 : IMPORTANCE = LOW, INTRODUCTION, INTERLUDE, OTHER NON-REPEATING PHRASE

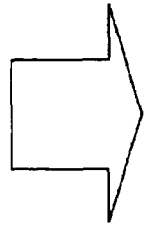

SONG INFORMATION FOR SONG A

SONG A

IMPORTANCE LEVEL = HIGH [1] : TIMES T3 - T4    IMPORTANCE LEVEL = LOW [1] : TIMES T0 - T1
IMPORTANCE LEVEL = HIGH [2] : TIMES T6 - T7    IMPORTANCE LEVEL = LOW [2] : TIMES T2 - T3
IMPORTANCE LEVEL = HIGH [3] : TIMES T8 - T9    IMPORTANCE LEVEL = LOW [3] : TIMES T4 - T5
IMPORTANCE LEVEL = HIGH [4] : TIMES T9 - T10   IMPORTANCE LEVEL = LOW [4] : TIMES T7 - T8
                                                IMPORTANCE LEVEL = LOW [5] : TIMES T10 - T11

IMPORTANCE LEVEL = INTERMEDIATE [1] : TIMES T1 - T2
IMPORTANCE LEVEL = INTERMEDIATE [2] : TIMES T5 - T6

INFORMATION PROCESSING DEVICE AND TRAVEL INFORMATION VOICE GUIDANCE METHOD

BACKGROUND OF THE INVENTION

1. Field of the Invention

This invention relates to an information processing device, comprising a song (music piece) playback device, and to a travel information voice guidance method, to provide voice guidance of travel information for a moving vehicle.

2. Description of the Related Art

Vehicle-mounted navigation systems, which are devices providing information on the vehicle position during travel and guidance for the route to a destination for the vehicle driver and passengers, are well-known. Such navigation systems make use of GPS (Global Positioning System) equipment, receiving radio waves transmitted from satellites to calculate vehicle position information including the current vehicle position and the direction of travel based on received signals, use map data to retrieve routes from the vehicle position to a destination, display the vehicle position together with a map on a display device, and in addition display the route to the destination or the current direction of travel.

Vehicle-mounted navigation systems comprising voice guidance functions, which use voice output to provide the driver with a route to a destination or other travel information, are also well-known. For example, when the vehicle approaches an intersection on the route to a destination, the system provides voice output giving travel information, such as "turn right at the next intersection".

Vehicle-mounted navigation systems comprising voice guidance functions are generally configured to operate in conjunction with vehicle-mounted audio equipment. That is, when the vehicle-mounted audio equipment is playing music, if the vehicle-mounted navigation system enters a state of providing voice guidance, the controller of the vehicle-mounted navigation system controls the audio equipment to temporarily halt music playback, or lowers the volume of the music playback, so that the driver or other user can easily hear the voice guidance of the vehicle-mounted navigation system.

However, for a user listening to music, there is the disadvantage that each time the vehicle-mounted navigation system provides voice guidance the volume of the music being played changes or the music itself is stopped, so that the music cannot be fully enjoyed.

This disadvantage is not limited to navigation systems mounted in vehicles or other information processing devices, but similarly applies to other information processing devices in vehicles comprising music playback equipment, which provide travel information through voice guidance.

SUMMARY OF THE INVENTION

The above disadvantage is one example of a problem to be resolved by this invention. An object of this invention is to provide an information processing device for vehicles and a travel information voice guidance method enabling the reliable provision of travel information through voice guidance, while avoiding insofar as possible the interruption of a user's enjoyment of music during music playback.

An information processing device of one aspect of this invention, which is a vehicle-mounted navigation system providing voice guidance of travel information for a vehicle, is characterized in comprising a song playback portion which outputs song audio signals representing song sounds; a travel information generation portion which generates the above travel information; a song playback judgment portion which judges, when the above travel information is generated by the above travel information generation portion, whether the above song playback portion is outputting the above song audio signals; and voice guidance output portion which, when the above song audio signals are judged as being output by the above song output judgment portion, outputs voice guidance audio signals representing said travel information, giving priority over the above song audio signals, according to at least either one of the urgency of the above generated travel information, and the type of musical phrase in the song for which the above song audio signals are currently being output.

A travel information voice guidance method of another aspect of this invention is a method in which vehicle travel information through voice guidance is provided, and comprises a song playback step of outputting song audio signals representing song sounds; a travel information generation step of generating the above travel information; a song playback judgment step of judging, when the above travel information is generated in the above travel information generation step, whether the above song audio signals are being output in the above song playback step; and a voice guidance output step, when in the above song playback judgment step it is judged that the above song audio signals are being output, of giving priority to voice guidance audio signals representing the above travel information over the above song audio signals, according to at least either one of the urgency of the above generated travel information, and the type of musical phrase in the song for which the above song audio signals are currently being output.

A program of another aspect of this invention is a computer-readable program which executes a travel information voice guidance method to provide vehicle travel information through voice guidance, and comprises a song playback step of outputting song audio signals representing song sounds; a travel information generation step of generating the above travel information; a song playback judgment step of judging, when the above travel information is generated in the above travel information generation step, whether the above song audio signals are being output in the above song playback step; and a voice guidance output step, when in the above song playback judgment step it is judged that the above song audio signals are being output, of giving priority to voice guidance audio signals representing the above travel information over the above song audio signals, according to at least either one of the urgency of the above generated travel information, and the type of musical phrase in the song for which the above song audio signals are currently being output.

BRIEF DESCRIPTION OF THE DRAWINGS

FIG. 17 shows examples of travel information with high, intermediate, and low urgency;

FIG. 25 is a flowchart showing processing for song information creation and storage;

FIG. 26 shows an example of importance settings for a song comprising a vocal portion;

FIG. 27 shows an example of creation of song information according to importance setting results;

FIG. 28 shows an example of importance settings for a song not comprising a vocal portion; and, FIG. 29 shows an example of creation of song information according to importance setting results.

DETAILED DESCRIPTION OF THE INVENTION

Figure 1:
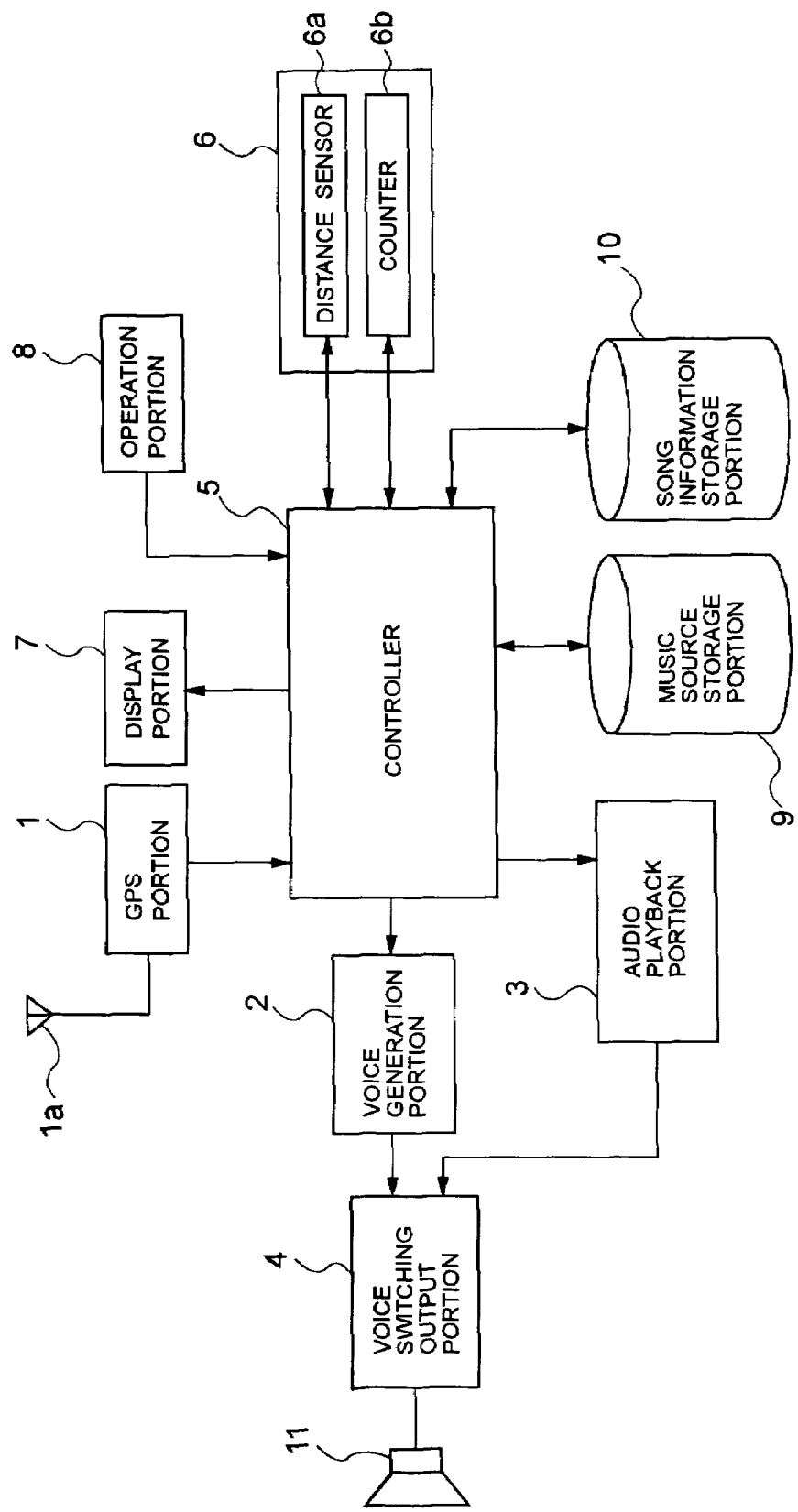
FIG. 1 is a block diagram showing an embodiment of this invention.

Below, embodiments of the invention are explained in detail, referring to the drawings.

FIG. 1 shows a vehicle-mounted navigation system with voice guidance to which this invention has been applied. This navigation system comprises a GPS (Global Positioning System) portion 1, voice generation portion 2, audio playback portion 3, voice switching output portion 4, controller 5, sensor portion 6, display portion 7, operation portion 8, music source storage portion 9, song information storage portion 10, and speaker 11. The GPS portion 1, voice generation portion 2, audio playback portion 3, voice switching output portion 4, sensor portion 6, display portion 7, operation portion 8, music source storage portion 9, and song information storage portion 10 are connected to the controller 5.

The GPS portion 1 uses a GPS antenna 1a to receive radio waves transmitted from a satellite, and based on the received signals, computes GPS vehicle position data, comprising the current vehicle position and direction of travel.

The sensor portion 6 has, at least, a distance sensor 6a which detects the travel distance of the vehicle, and a counter 6b which measures time. The outputs of the distance sensor 6a and counter 6b are each connected to the controller 5. The sensor portion 6 may comprise sensors which detect the vehicle velocity, engine rotation rate, direction of travel, or other operation states, and may also comprise wireless communication equipment to obtain travel information from other vehicles or from an information transmission center (a server providing information).

The controller 5 controls the GPS portion 1, voice generation portion 2, audio playback portion 3, voice switching output portion 4, display portion 7, music source storage portion 9, and song information storage portion 10.

Also, the controller 5 uses map data recorded in advance on recording media (not shown) to compute routes from the current position to a destination. The map data and other display data recorded in advance on the recording media is read and supplied to the display portion 7. Also, when the current vehicle position approaches the point of an intersection or similar, travel information for the driver (digital signals) is generated. For example, when, on a route to a destination, there is a need to turn right at the next intersection, travel information is generated representing the contents of announcement of a right turn at the next intersection. The travel information may be digital audio signals or compressed digital audio signals, or may be data corresponding to the announcement contents and not comprising an audio signal component. The urgency of the travel information is indicated as, at least, "high" or "low". For example, when the travel information is "please turn right at the next intersection", the urgency is indicated as high; when the travel information is "there is traffic congestion XX km ahead" or "the sun is setting, check your headlights", the urgency is indicated as low.

The voice generation portion 2 converts travel information supplied by the controller 5 into analog audio signals, which are supplied to the voice switching output portion 4.

The audio playback portion 3 is a device which plays songs; song sound data is supplied from the music source storage portion 9, and analog audio signals representing performance sounds are output according to the song sound data. The audio playback portion 3 may be a display or memory player.

The voice switching output portion 4 selects, amplifies and outputs audio signals from the voice generation portion 2 (voice guidance audio signals) and audio signals from the audio generation portion 3 (song audio signals) according to commands from the controller 5. In the initial state, the voice switching output portion 4 amplifies and outputs audio signals from the audio playback portion 3.

The display portion 7 displays course information according to display data provided by the controller 5 and displays the action state according to commands supplied by the controller 5.

The operation portion 8 performs operations to instruct actions of the navigation system. Operation contents of the operation portion 8 are supplied as data to the controller 5.

The music source storage portion 9 stores song sound data for each of a plurality of songs, as described above. Song sound data comprises digital audio signals representing song sounds, or signals obtained by compressing such audio signals. Song sound data for a plurality of songs stored in the music source storage portion 9 is selected according to instructions from the controller 5, and the song sound data of selected songs is supplied to the audio playback portion 3 from the music source storage portion 9.

Figure 2:
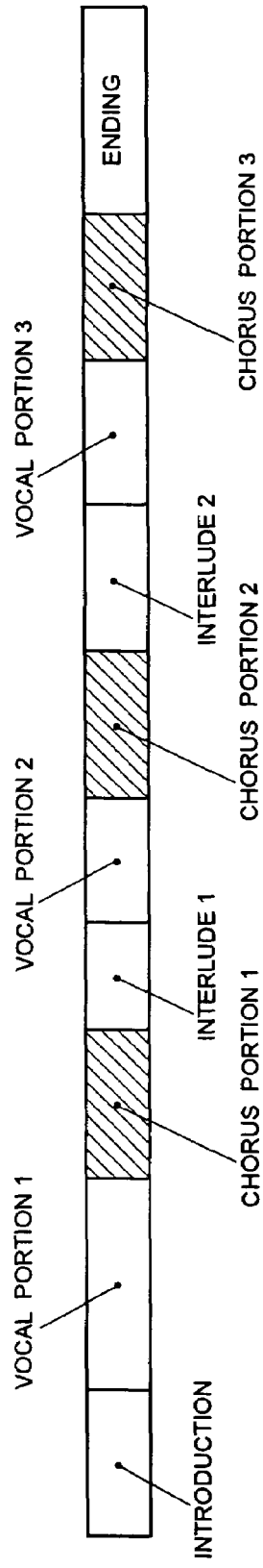
FIG. 2A and FIG. 2B show song structure and song information.

The song information storage portion 10 stores song configuration information as song information for each of the plurality of songs stored as song sound data in the music source storage portion 9. Song information indicates the start and end times of portions equivalent to types of musical phrases in the song, that is, phrases which are the song introduction, vocal portions, interludes, ending, and chorus or "hook" portion. For example, in the case of a song having the song structure shown in FIG. 2A, the song information is, as shown in FIG. 2B, introduction: 0'00" to 0'30", vocal portion 1: 0'30" to 1'50", interlude 1: 1'50" to 2'20", vocal portion 2: 2'20" to 3'30", interlude 2: 3'30" to 3'50", vocal portion 3: 3'50" to 4'40", ending: 4'40" to 5'10", chorus portion 1: 1'20" to 1'50", chorus portion 2: 3'00" to 3'30", chorus portion 3: 4'10" to 4'40". As the song information, the song name, singer name, genre, performance time, and other information may be stored. In addition, the song sound data for each of the plurality of songs in the music source storage portion 9, and the song information in the song information storage portion 10, are associated.

The speaker 11 is connected to the output of the voice switching output portion 4, and is driven according to output signals from the voice switching output portion 4.

Figure 3:
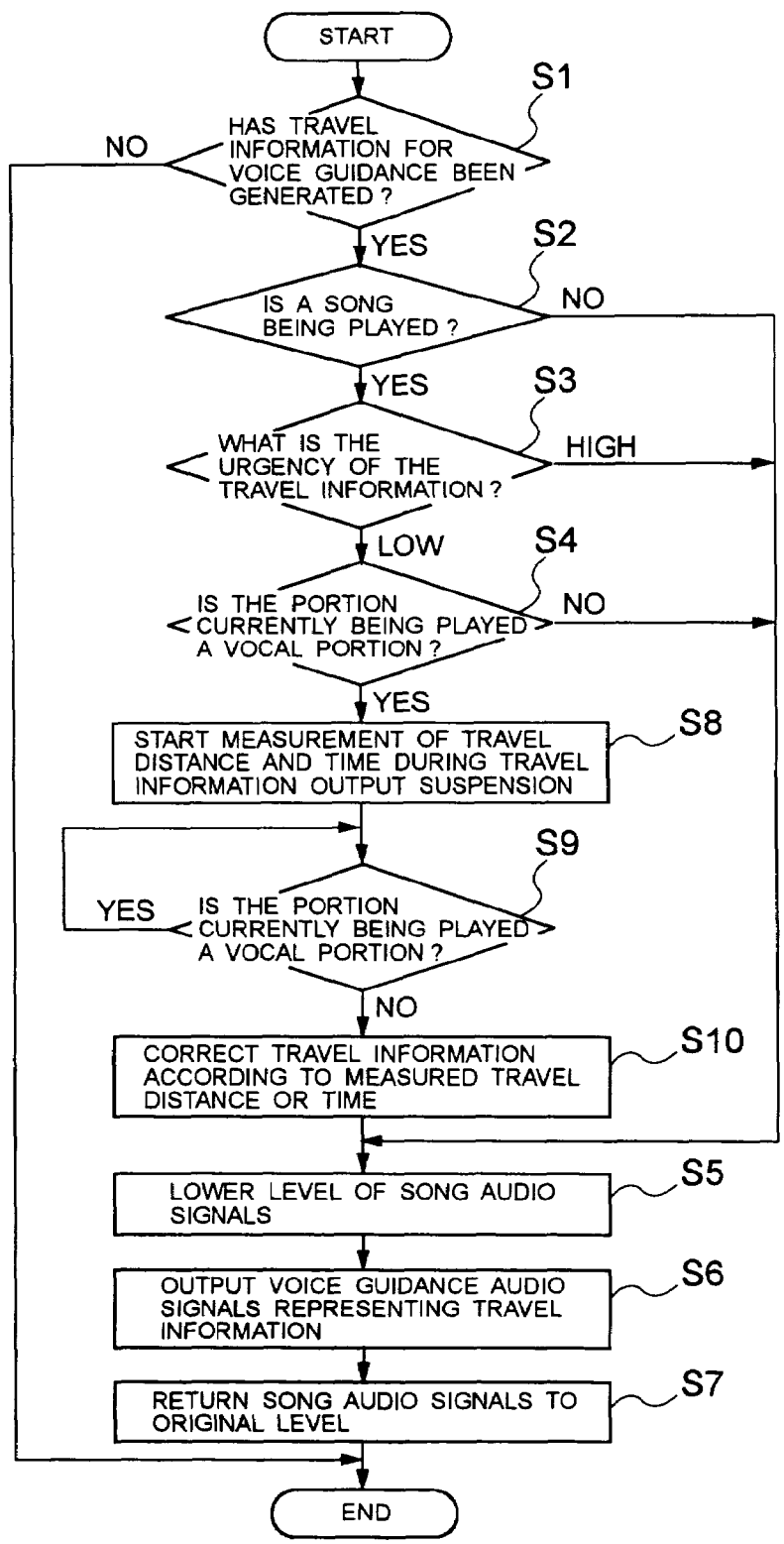
FIG. 3 is a flowchart showing action of the controller.

Next, the action of a navigation system of this invention with the above-described configuration is explained, referring to the flowchart showing the action of the controller 5 in FIG. 3.

As indicated in FIG. 3, the controller 5 judges whether travel information has been generated for output as guidance voice output (step S1). When for example an intersection or other point on a route being traveled to a destination is approached, the controller 5 performs an action to generate travel information, based on an interrupt action. When travel information is generated, the controller 5 judges whether a song is being played or not (step S2). During song playback by the audio playback portion 3, audio signals are output from the audio playback portion 3, and these audio signals, after amplification by the voice switching output portion 4, are supplied to the speaker 11. Song sounds are output from the speaker 11. During song playback, flags and other action state data indicating song playback are supplied by the audio playback portion 3, so that the controller can judge whether a song is being played from the action state data. The action state data comprises a song identifier and the elapsed play time.

When the controller 5 judges that a song is being played by the audio playback portion 3, the urgency of the generated travel information is judged to be either high or low (step S3). As explained above, the urgency of travel information is indicated according to the information content, and so the urgency, whether high or low, is judged according to the generated travel information.

When in step S3 the urgency is judged to be low, the controller 5 judges whether the portion of the song currently being played is a vocal portion (including chorus portions) (step S4). This judgment is performed according to the elapsed play time in the action state data supplied by the audio playback portion 3, and the song information stored in the song information storage portion 10. Song information for the song currently being played is read from the song information storage portion 10, and a judgment is made as to whether the portion currently being played and corresponding to the elapsed play time is a vocal portion or not, based on the song structure indicated in the song information. For example, if a song with the song structure indicated in FIG. 2B is being played, with the elapsed play time is 2'00", the portion currently being played is a vocal portion, but when the elapsed play time is 3'00", the portion is not a vocal portion, but is an interlude.

When in step S2 it is judged that a song is being played, in step S3 the urgency of travel information is judged to be high, or in step S4 the currently played portion of the song being played is judged to be other than a vocal portion, the controller 5 issues an instruction to the voice switching output portion 4 to lower the level of the audio signal from the audio playback portion 3 (step S5). In response to this instruction, the voice switching output portion 4 lowers the amplification gain, to lower the level of the audio signal from the audio playback portion 3. As a result, a voice guidance audio signal from the voice generation portion 2, that is, a voice guidance audio signal with travel information, can be output via the voice switching output portion 4. By lowering the amplification gain, the voice switching output portion 4 may completely cut off the audio signal from the audio playback portion 3, or may lower the level to a sufficiently low level compared with the voice guidance audio signal.

The controller 5 supplies the generated travel information to the voice generation portion 2, causing the voice announcement signals (voice guidance audio signals) output by the voice generation portion 2 to be supplied to the voice switching output portion 4 (step S6). When travel information is supplied, the voice generation portion 2 converts the travel information into analog audio signals, which are supplied to the voice switching output portion 4. Hence in the voice switching output portion 4, which is in a state enabling output of voice guidance audio signals with travel information, the voice guidance audio signals are amplified and supplied to the speaker 11. The voice announcement of travel information is then output from the speaker 11. That is, when the urgency of travel information generated during song playback is high, or when the urgency of the travel information generated during playback of a vocal portion of the song is low, the song playback sound level is immediately lowered, and the travel information contents are output as a voice announcement.

After execution of step S6, that is, after the voice announcement of the travel information, the controller 5 issues an instruction to the voice switching output portion 4 to return the level of audio signals from the audio playback portion 3 to the original level (step S7). In response to this instruction, the voice switching output portion 4 raises the amplification gain of audio signals from the audio playback portion 3 to the gain in effect immediately prior to step S5. By this means, audio signals from the audio playback portion 3 are amplified by the voice switching output portion 4 and then supplied to the speaker 11, so that song sounds are output from the speaker 11.

If in step S4 the portion currently being played of the song being played is judged to be a vocal portion, the controller 5 causes the travel information output to be suspended, the distance sensor 6a and counter 6b are each reset, and the travel distance and time are measured (step S8). Then, a judgment is again made as to whether the portion currently being played of the song being played is a vocal portion (step S9). Step S9 is executed repeatedly until the portion currently being played is other than a vocal portion. When it is judged in step S9 that the portion currently being played of the song being played is other than a vocal portion, the distance traveled and time elapsed during suspension of the travel information output, measured using the distance sensor 6a and counter 6b, are read, and the travel information is modified using this travel distance or time (step S10). That is, when the travel information comprises a portion indicating a distance, the distance is shortened by the amount of the read-out travel distance. And, if the travel information comprises a portion indicating time, the time is shortened by the amount of the read-out travel time. For example, if the originally generated travel information indicates that "there is congestion 3 km ahead", and if during suspension of travel information output there has been travel over 1 km, then the travel information would be modified to "there is congestion 2 km ahead". Provisions are made such that the portions of travel information corresponding to travel distance and to travel time can be distinguished either through the combination of a numerical value and a unit such as kilometers or minutes, or through use of dedicated identifiers.

After execution of step S10, the controller 5 executes the above steps S5 through S7. Modified travel information is supplied to the voice generation portion 2 by the controller 5, and in the voice generation portion 2 the modified travel information is converted into audio signals representing a voice announcement, which are supplied via the voice switching output portion 4 to the speaker 11. By this means, a voice announcement of travel information, with time or distance modified as appropriate, is output from the speaker 11 immediately after the end of the vocal portion of the song being played.

In other words, when the urgency of travel information generated during playback of a vocal portion of a song is low, the song playback sounds continue to be output until the vocal portion of the song ends, and after the end of the vocal portion, the level of the song playback sound is lowered, while a voice announcement of the travel information with time or distance modified as appropriate is output.

When there are no portions of the travel information relating to time or to distance, the above-described modification is not performed.

Figure 4:
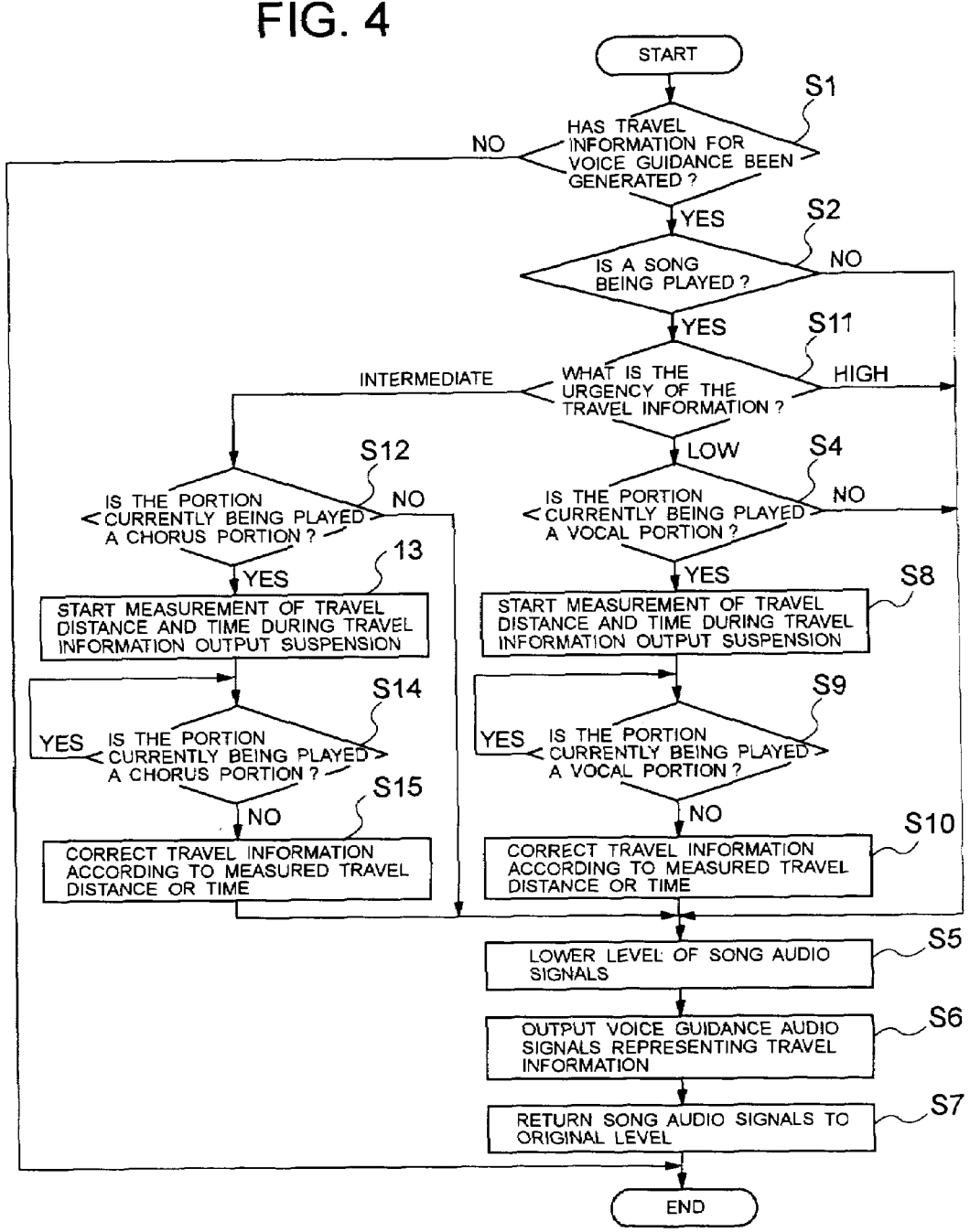
FIG. 4 is a flowchart showing action of the controller in another embodiment of the invention.

FIG. 4 is a flowchart showing action of the controller 5 in another embodiment of the invention. In this embodiment, the urgency of travel information is described as high, intermediate, or low.

When the audio playback portion 3 is judged to be playing a song, the controller 5 judges whether the urgency of generated travel information is high, intermediate, or low (step S11). Similarly to the case of the embodiment of FIG. 3, when the urgency is low, step S4 is executed, and when the urgency is high, step S5 is executed.

When, as shown in FIG. 4, the controller judges the urgency to be intermediate in step S11, a judgment is made as to whether the portion currently being played of the song being played is a chorus portion or not (step S12). This judgment is performed by a method similar to the method of judging, in step S4, whether the currently played portion of a song is a vocal portion or not. As indicated in FIG. 2A, when a portion of a vocal portion is a chorus portion, chorus portion is given priority.

When in step S12 the currently played portion of a song is judged to be a chorus portion, travel information output is suspended, the distance sensor 6a and counter 6b are both reset, and the travel distance and time are caused to be measured (step S13). Then, a judgment is again performed as to whether the currently played portion of the song is a chorus portion (step S14). Step S14 is executed repeatedly until the currently played portion is other than a chorus portion. When in step S14 it is judged that the currently played portion of the song is other than a chorus portion, the travel distance and time during suspension of travel information output, measured by the distance sensor 6a and counter 6b, are read, and the travel information is corrected using this travel distance and time (step S15). Step S15 is performed similarly to the travel information correction of step S9.

After execution of step S15, the controller 5 executes the above steps S5 through S7. Hence the corrected travel information is supplied by the controller 5 to the voice generation portion 2, and the voice generation portion 2 converts this corrected travel information into analog audio signals representing a voice announcement, which are then supplied, via the voice switching output portion 4, to the speaker 11. As a result, immediately after the end of the chorus portion of the song being played, a voice announcement providing travel information, with time or distance corrected, is output from the speaker 11.

That is, when the urgency of travel information generated during the playing of a chorus portion of a song is intermediate, the song playback sounds continue to be output until the end of the chorus portion of the song, and after the end of the chorus portion, the volume of the song playback sound is lowered, while at the same time a voice announcement of the travel information, with time or distance modified, is output.

When the urgency of travel information generated during playing of a vocal portion of a song is low, the song playback sounds continue to be output until the end of the vocal portion of the song, and after the end of the vocal portion, the volume of the song playback sound is lowered, while at the same time a voice announcement of the travel information, with time or distance modified, is output.

Figure 5:
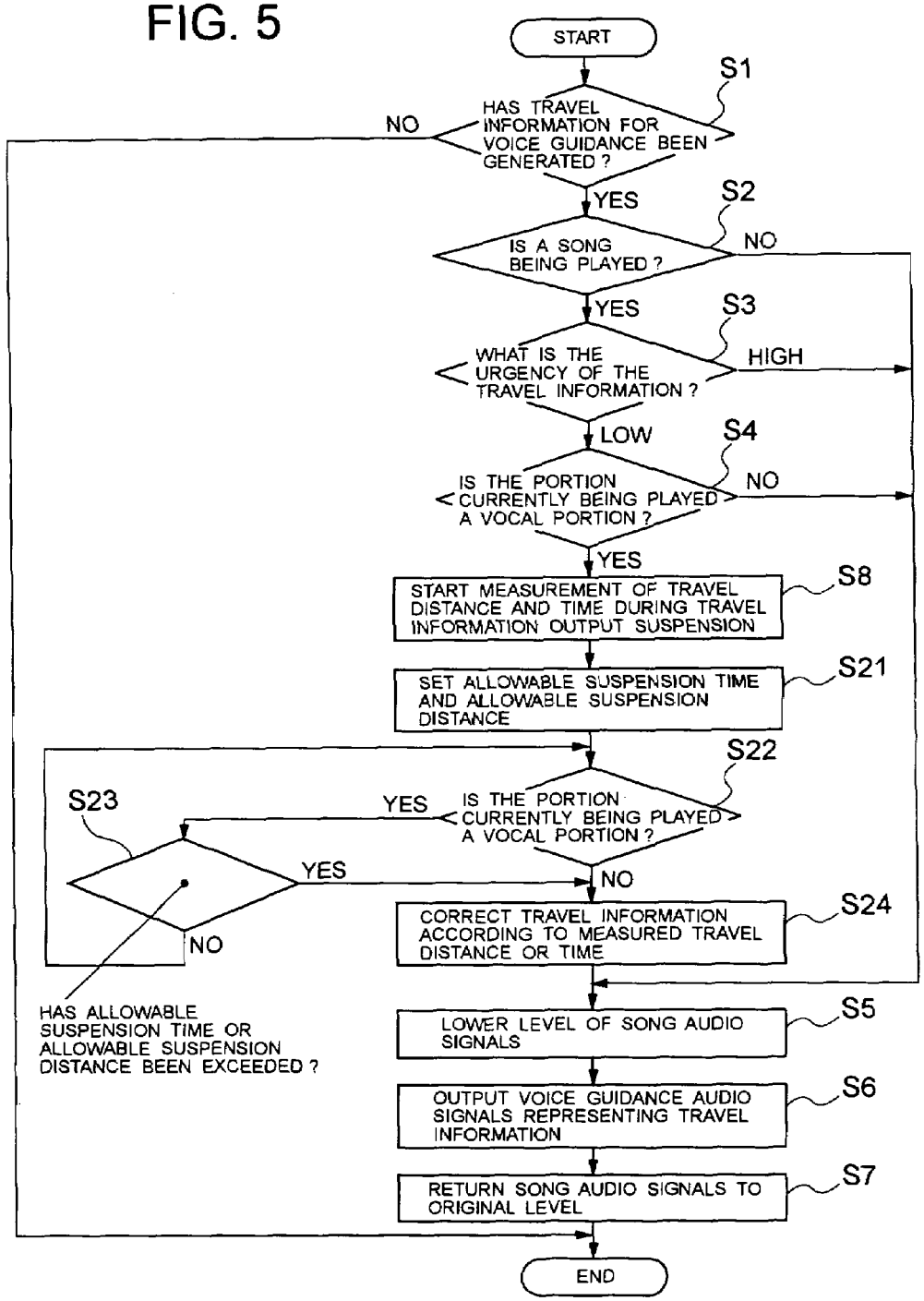
FIG. 5 is a flowchart showing action of the controller in another embodiment of the invention.

FIG. 5 is a flowchart showing the action of the controller 5 in another embodiment of the invention. In this embodiment, the urgency of travel information is described as high or low.

The action by the controller 5 in steps S1 through S7 is the same as in the embodiment of FIG. 3. When in step S4 the currently playing portion of the song being played is judged to be a vocal portion, the controller 5 causes the travel information output to be suspended, the distance sensor 6a and counter 6b are each reset, and the travel distance and time are measured (step S8). Then, an allowable suspension distance and an allowable suspension time are set (step S21). The allowable suspension time is the time in which the urgency of the travel information generated changes from low to high as a result of continued travel of the vehicle; the allowable suspension distance is, similarly, the time in which the urgency changes from low to high.

Another judgment is made as to whether the currently playing portion of the song being played is a vocal portion (step S22). If in step S22 the currently playing portion is judged to be a vocal portion, the travel distance and time during the suspension of travel information output, as measured by the distance sensor 6a and counter 6b, are read, and a judgment is made as to whether the travel distance has exceeded the allowable suspension distance or the travel time has exceeded the allowable suspension time (step S23).

If, as the result of the judgment of step S23, the travel distance has not exceeded the allowable suspension distance and the travel time has not exceeded the allowable suspension time, then processing returns to step S22. If on the other hand the travel distance has not exceeded the allowable suspension distance and the travel time has not exceeded the allowable suspension time, then the travel information is modified using the allowable suspension distance or the allowable suspension time (step S24). That is, if there is a portion of the travel information indicating distance, this distance is shortened by the allowable suspension distance. And, if there is a portion of the travel information indicating time, this time is shortened by the allowable suspension time.

Even in the case of travel information with low urgency in the suspended state, there are cases in which the urgency rises during the output suspension period. When for example the travel information indicates that "there is congestion XX km ahead", initially the urgency is low; but if, during output suspension, the vehicle travels far enough to approach the area of congestion, the user must be notified of the travel information in the interest of safety, and so the urgency may be changed to high. When the urgency rises during the suspension of output of travel information which initially is of low urgency, as high-urgency travel information, the volume of the vocal portion of the song being played is lowered unconditionally (including noise reduction), and a voice announcement of the travel information, with time or distance modified, is output.

Figure 6:
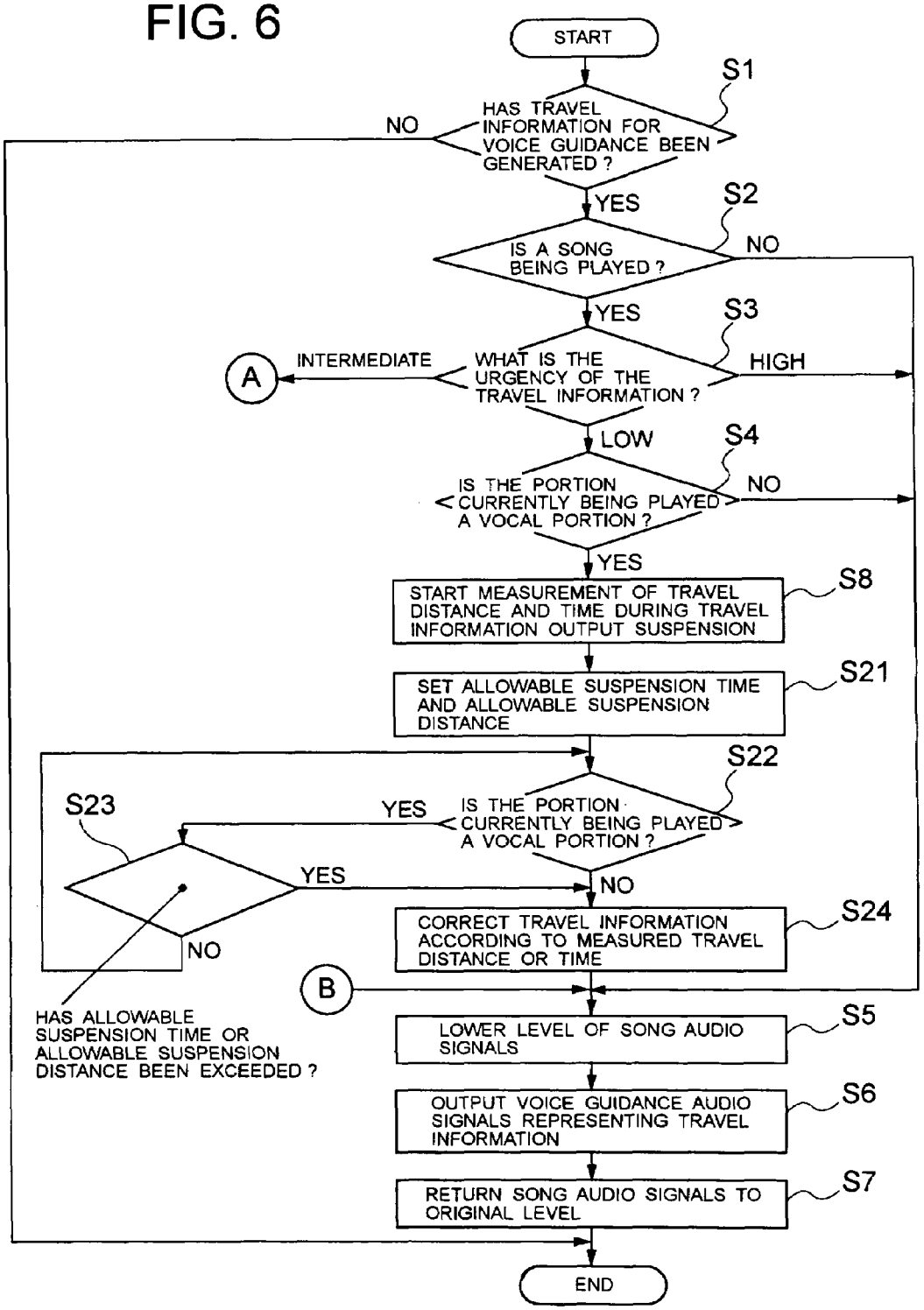
FIG. 6 is a flowchart showing action of the controller in another embodiment of the invention.
Figure 7:
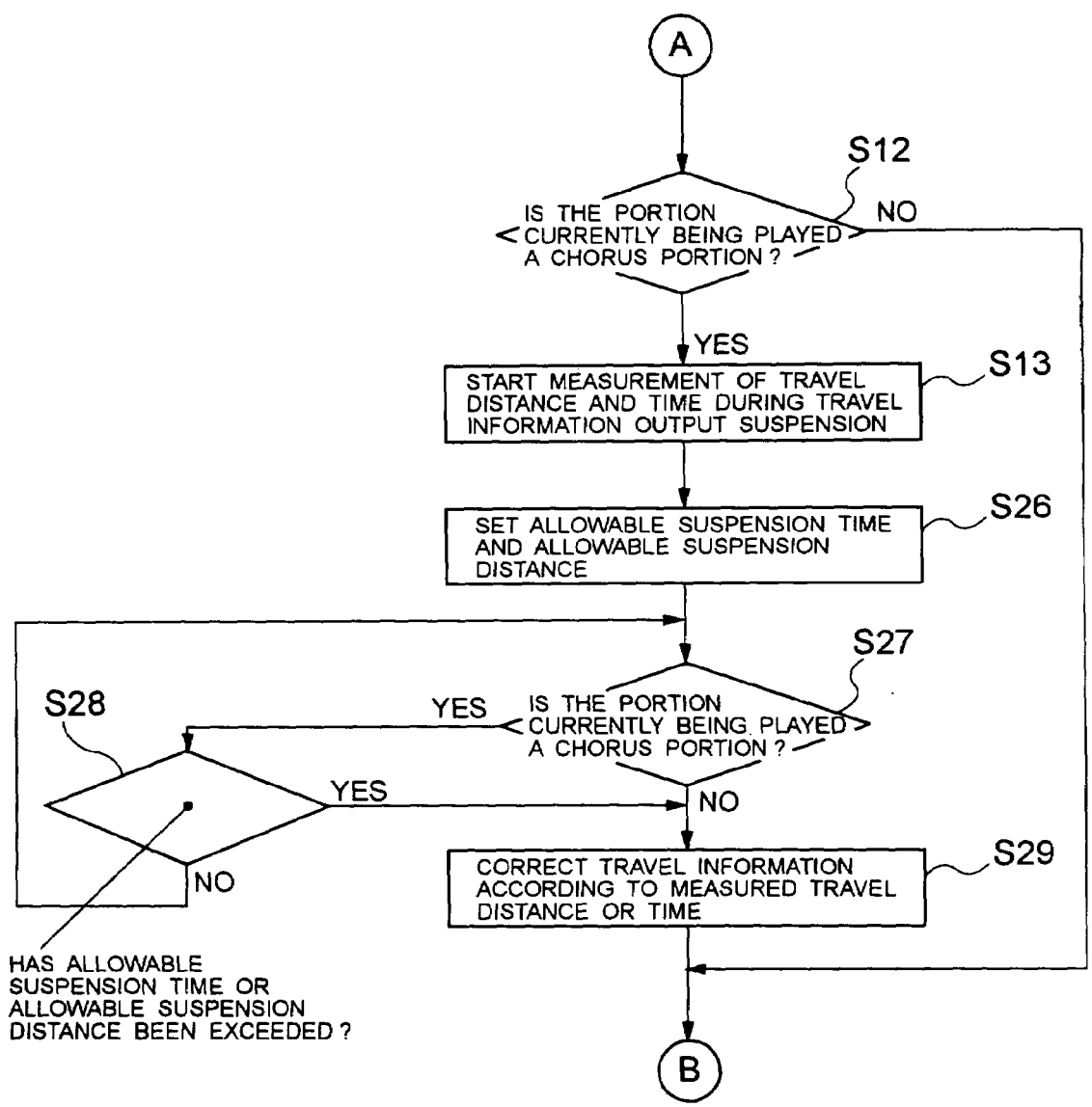
FIG. 7 is a flowchart showing a continued portion of the action of the controller in FIG. 6.

FIG. 6 and FIG. 7 are flowcharts showing the action of the controller 5 in another embodiment of the invention. In this embodiment, the urgency of travel information is described as high, intermediate, or low.

As indicated in FIG. 6 and FIG. 7, when in step S11 the urgency is judged to be intermediate, the controller 5 judges whether the currently played portion of the song being played is a chorus portion (step S12). This judgment is performed by a method similar to the method of judging whether the currently played portion of a song is a vocal portion, in step S4.

When in step S12 the currently playing portion of the song being played is judged to be a chorus portion, the controller 5 suspends travel information output, resets both the distance sensor 6a and the counter 6b, and starts measurement of the travel distance and time (step S13). The allowable suspension time and allowable suspension distance are set (step S26), and a judgment is again made as to whether the currently playing portion of the song being played is a chorus portion (step S27). If in step S27 the currently playing portion is judged to be a chorus portion, the travel distance and time during the suspension of travel information output, measured by the distance sensor 6a and counter 6b, are read, and a judgment is made as to whether the travel distance exceeds the allowable suspension distance or the travel time exceeds the allowable suspension time (step S28).

If the result of the judgment of step S28 is that the travel distance does not exceed the allowable suspension distance and the travel time also does not exceed the allowable travel time, processing returns to step S27. If on the other hand the travel distance does not exceed the allowable suspension distance and the travel time also does not exceed the allowable suspension time, the travel information is modified using the allowable suspension distance or the allowable suspension time (step S29). That is, if there is a portion of the travel information indicating distance, this distance is shortened by the allowable suspension distance. And, if there is a portion of the travel information indicating time, this time is shortened by the measured travel time.

There are even cases in which the urgency of intermediate-urgency travel information in a state of suspension may, during the suspension period, rise. When the travel information is, for example, "turn left at the intersection XX hundred meters ahead", the urgency may initially be intermediate, but when the vehicle approaches a congested area during travel with output suspended, it may be necessary to notify the user of the travel information for safety's sake, so that the urgency may rise to high. When the urgency rises during the period in which output of intermediate-urgency travel information is suspended, as high-urgency travel information, the volume of the chorus portion of the song being played is lowered unconditionally (including noise reduction), and a voice announcement of the travel information, with time or distance modified, is output.

Other steps in the flowcharts of FIG. 6 and FIG. 7 are the same as steps with the same numbers in the flowcharts of FIG. 4 and FIG. 5.

Figure 8:
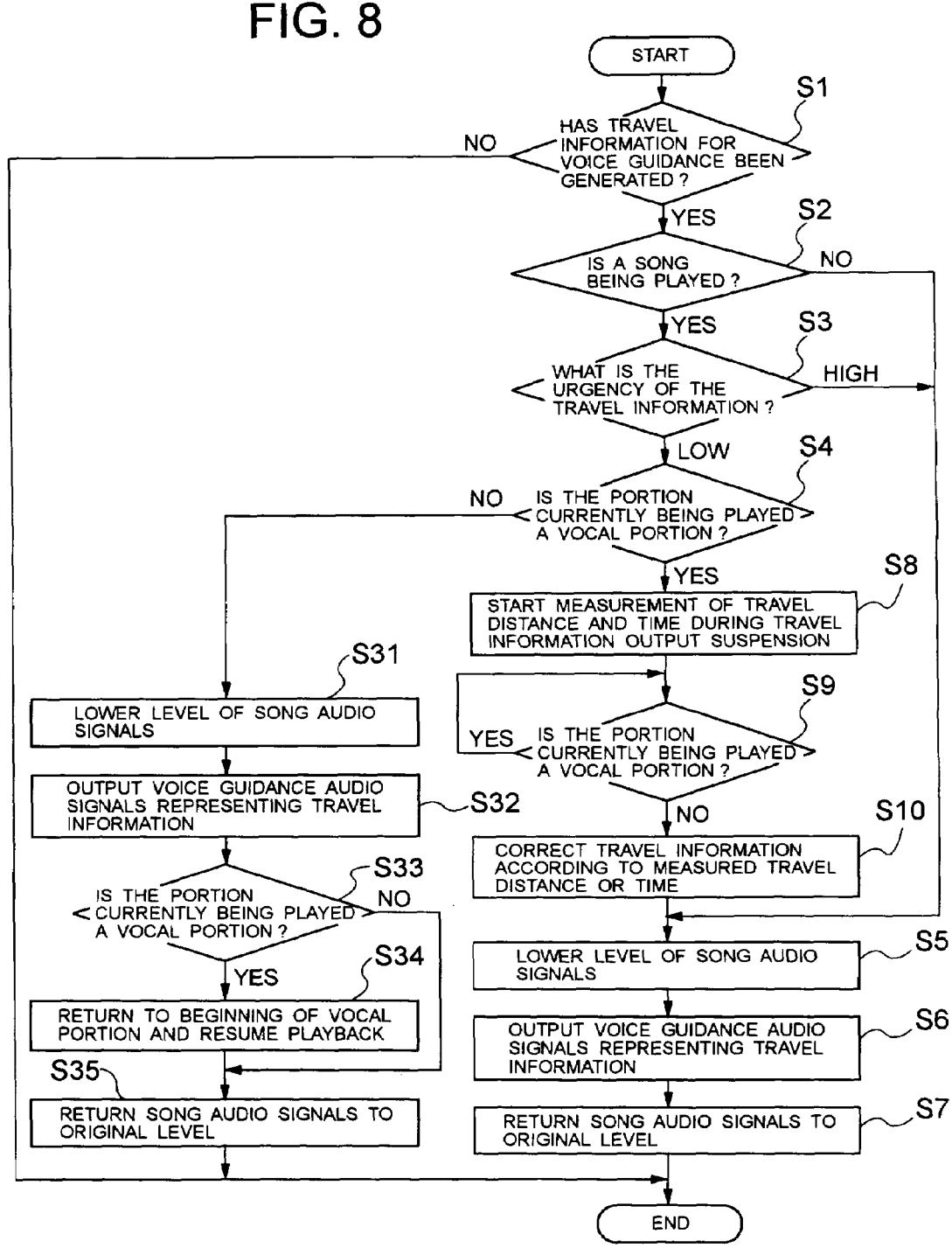
FIG. 8 is a flowchart showing action of the controller in another embodiment of the invention.

FIG. 8 is a flowchart showing the action of the controller 5 in another embodiment of the invention. In this embodiment, the urgency of travel information is described as high or low.

As shown in FIG. 8, when in step S4 the currently playing portion of the song being played is judged to be other than a vocal portion, the controller 5 issues to the voice switching output portion 4 an instruction to lower the volume of the audio signal from the audio playback portion 3 (step S31), the generated travel information is supplied to the voice generation portion 2, and the announcement voice signals output by the voice generation portion 2 are supplied to the voice switching output portion 4 (step S32). The action of steps S31 and S32 is the same as in steps S5 and S6 in FIG. 3.

After execution of step S32, the controller 5 judges whether the currently playing portion of the song being played is a vocal portion (step S33). If a vocal portion is being played, the audio playback portion 3 is caused to return to the beginning of the vocal portion and resume playing (step S34). In step S34, the controller 5 can obtain the start time of the vocal portion using song information stored in the song information storage portion 10, and so instructs the audio playback portion 3 to play the song from the starting time of the vocal portion. The audio playback portion 3 returns the playback position from midway through the vocal portion of the song to the beginning, according to this instruction, and again begins playback. After execution of step S34, the controller 5 issues an instruction to the voice switching output portion 4 to return the amplification gain of the audio signal from the audio playback portion 3 to the original gain (step S35). The action of step S35 is the same as that of step S7 in FIG. 3.

If in step S33 a vocal portion is not being played, processing proceeds immediately to step S35, and song sounds are output from the speaker 11.

When the song enters a vocal portion at the time of generation of such travel information with low urgency, at the time voice output ends, the song playback returns to the beginning of the vocal portion, the song playback level is raised, and playback is resumed. As a result, the user can fully enjoy the vocal portion of the song.

Figure 9:
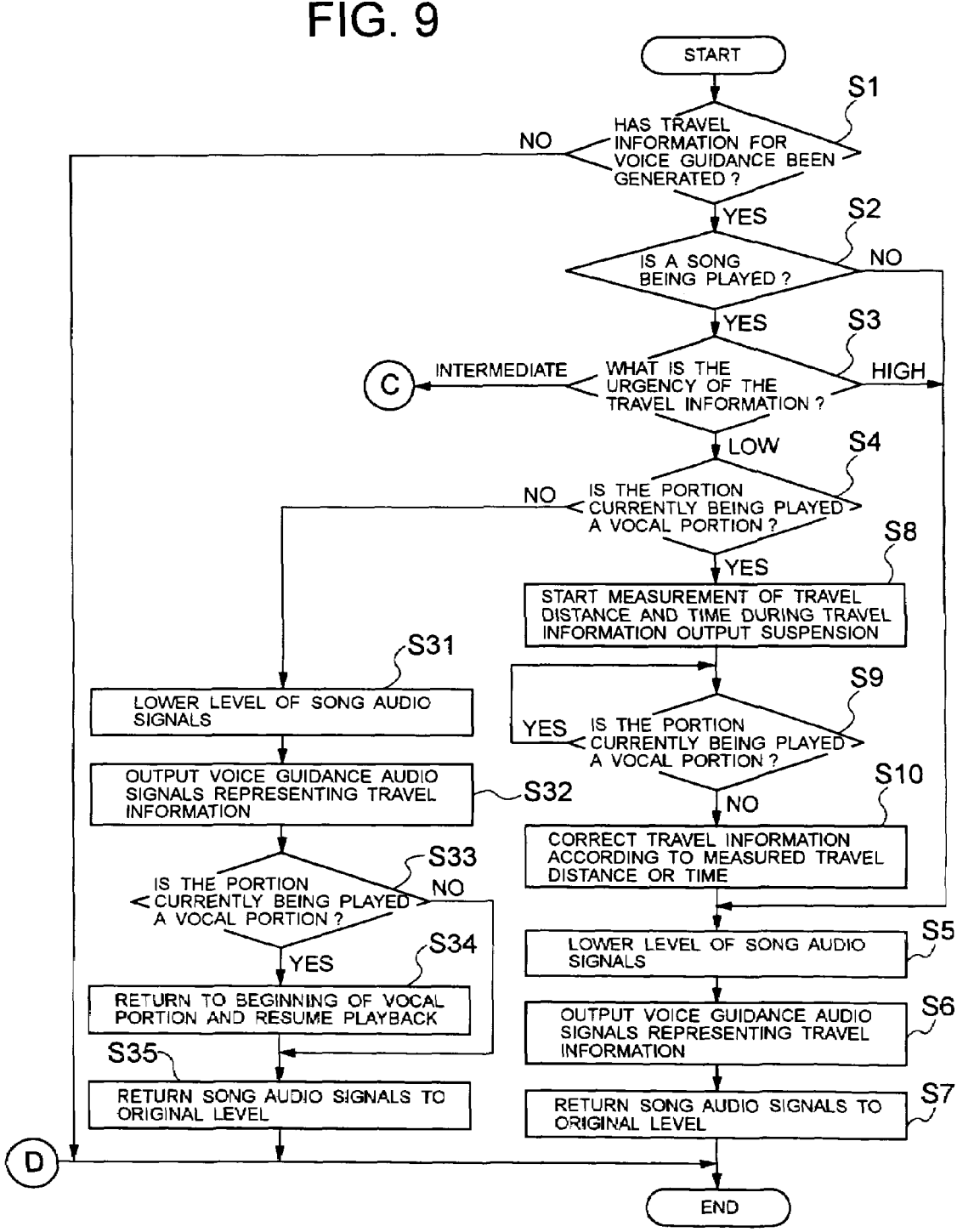
FIG. 9 is a flowchart showing action of the controller in another embodiment of the invention.
Figure 10:
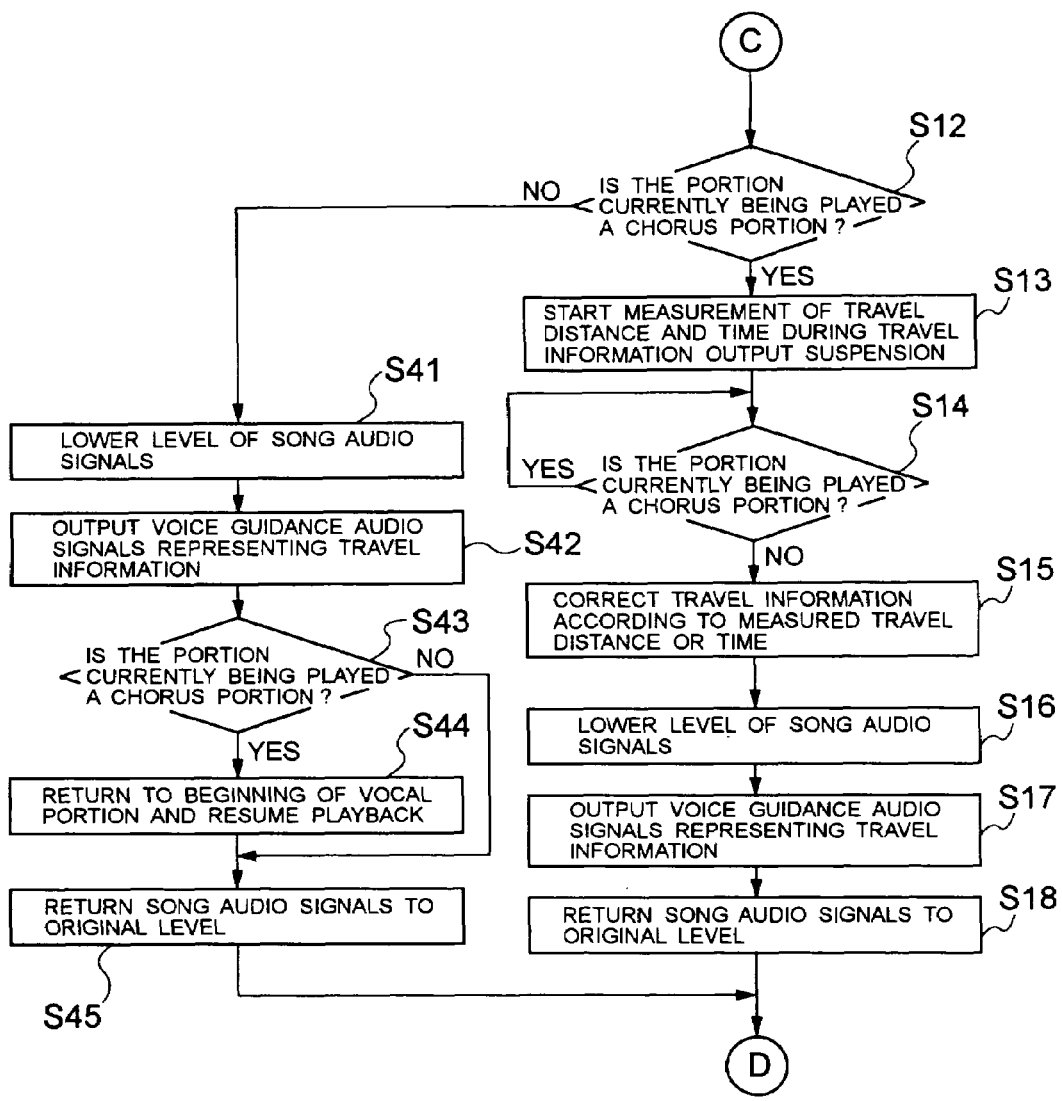
FIG. 10 is a flowchart showing a continued portion of the action of the controller in FIG. 9.

FIG. 9 and FIG. 10 are flowcharts showing the action of the controller 5 in another embodiment of the invention. In this embodiment, the urgency of travel information is described as high, intermediate, or low.

In FIG. 9 and FIG. 10, the same steps as in the flowcharts of FIG. 6 through FIG. 8 have the same step numbers. The actions of steps S16 through S18 are the same as those of steps S5 through S7.

When, as shown in FIG. 9 and FIG. 10, the currently playing portion of the song being played is judged in step S12 to be other than a chorus portion, the controller 5 issues an instruction to the voice switching output portion 4 to lower the amplification gain of audio signals from the audio playback portion 3 (step S41), supplies the generated travel information to the voice generation portion 2, and causes the voice announcement signals output by the voice generation portion 2 to be supplied to the voice switching output portion 4 (step S42). The actions of steps S41 and S42 are the same as in steps S5 and S6 of FIG. 3.

After execution of step S42, the controller 4 judges whether the currently playing portion of the song being played is a chorus portion (step S43). If a chorus portion is being played, the audio playback portion 3 is caused to return to the beginning of the chorus portion and resume playback (step S44). In step S44, the controller 5 can obtain the start time of the chorus portion using the song information stored in the song information storage portion 10, and so issues an instruction to the audio playback portion 3 to begin playback from the start time of the chorus portion. The audio playback portion 3, in accordance with this instruction, returns the playback position from midway through the chorus portion of the song to the beginning of the chorus portion, and again performs playback. After execution of step S44, the controller 5 issues an instruction to the voice switching output portion 4 to return the amplification gain of audio signals from the audio playback portion 3 to the original gain (step S45). The action of step S45 is the same as that of step S7 in FIG. 3.

In step S43, if a chorus portion is being played, processing immediately proceeds to step S45, and song sounds are caused to be output from the speaker 11.

In this way, when a song enters a chorus portion as low-urgency travel information is generated, at the end of voice output, the song playback returns to the beginning of the chorus portion, the song playback volume is raised, and playback is resumed. As a result, the user can fully enjoy the chorus portion of the song.

In this way, the navigation system classifies the information for voice output into levels of urgency, and when the urgency is high, immediately lowers the music volume and provides voice notification to the driver or other user, but when the urgency is low, waits until a portion other than a vocal portion (an introduction, interlude, or ending) for output, so that the user can fully enjoy the music without the music being interrupted by voice guidance which is not immediately necessary. On the other hand, in the case of information with high urgency, which must be known immediately, the playback sound volume is lowered and voice notification is provided, so that the user can obtain adequate driving information.

Figure 11:
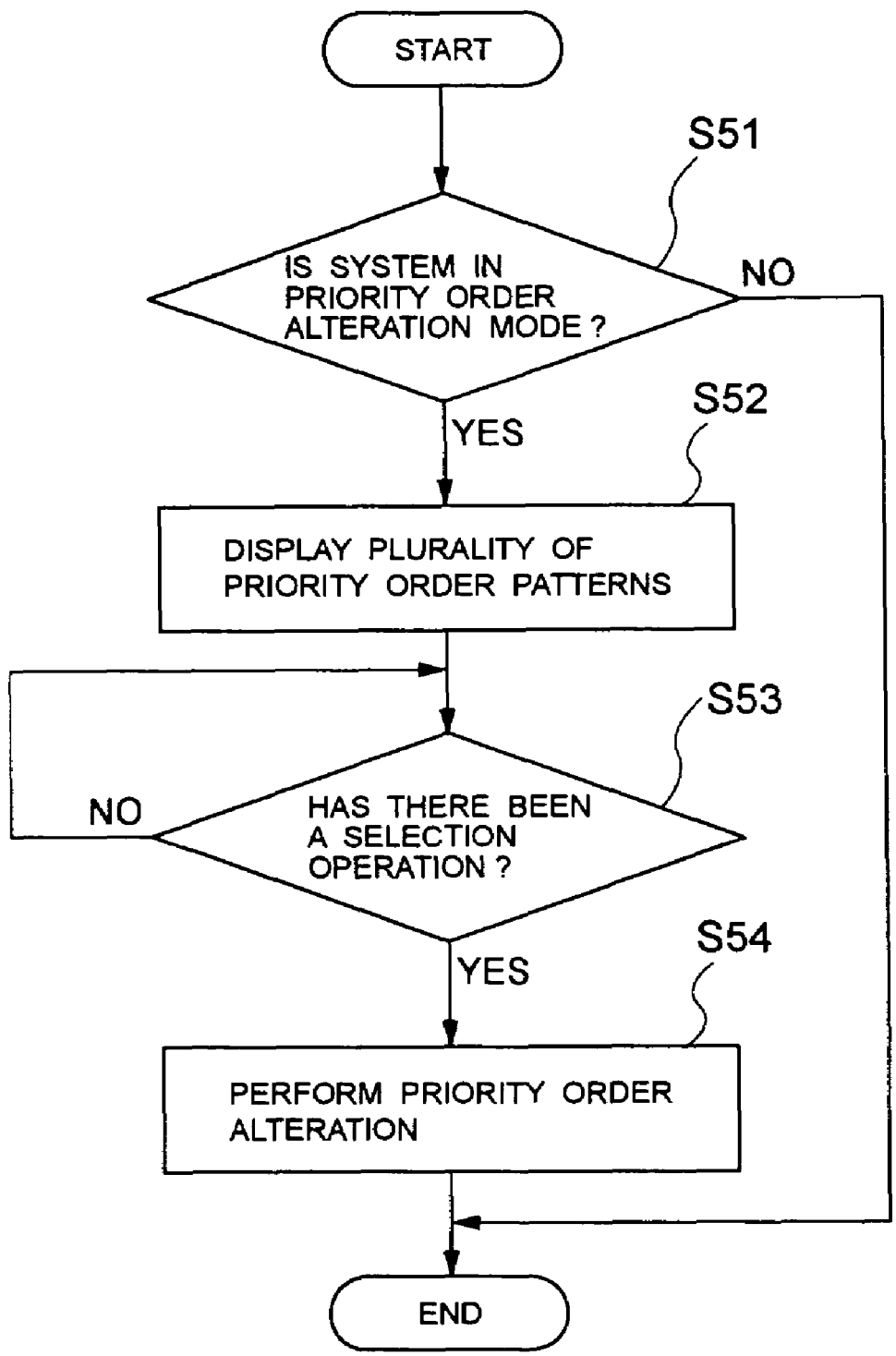
FIG. 11 is a flowchart showing action for priority order modification.

In each of the above-described embodiments, the order of priority of travel information and of phrases in songs is determined in advance. That is, in the action example shown in FIG. 3, the order of priority is travel information with high urgency, vocal portions, travel information with low urgency, and phrases other than vocal portions. In the action example shown in FIG. 4, the order of priority is travel information with high urgency, chorus portions, travel information with intermediate urgency, vocal portions, travel information with low urgency, and phrases other than vocal portions. The order of priority may be altered through user operation. FIG. 11 is a flowchart showing priority order alteration action to alter the order of priority, according to user operation. In this priority order alteration action, a plurality of priority order patterns are created in advance as data and saved in memory, not shown, within the controller 5. Each of the plurality of priority order patterns indicates an order of priority of the degrees of travel information urgency (high/low, or high/intermediate/low) and of phrase types in a song, with different positions for each priority order pattern.

As shown in FIG. 11, in priority order alteration action the controller 5 judges whether the priority order alteration mode has been entered in response to operation of the operation portion 8 by the user (step S51). If the priority order alteration mode has been entered, the controller 5 causes an image for selection from a plurality of priority order patterns to be displayed on the display portion 7 (step S52). The image for selection from a plurality of priority order patterns displayed on the display portion 7 shows for each pattern, for example, the priority order of degrees of urgency of travel information and of types of phrases in a song. Hence the user can select one arbitrary pattern from among the plurality of priority order patterns through operation of the operation portion 8. After execution of step S52, the controller 5 judges whether there has been a selection operation (step S53). If there has been a selection operation, priority order alteration is performed so as to use the priority order indicated in the selected priority order pattern in the above-described steps S3 and S4, or steps S1, S12 and S4 (step S54).

Figure 12:
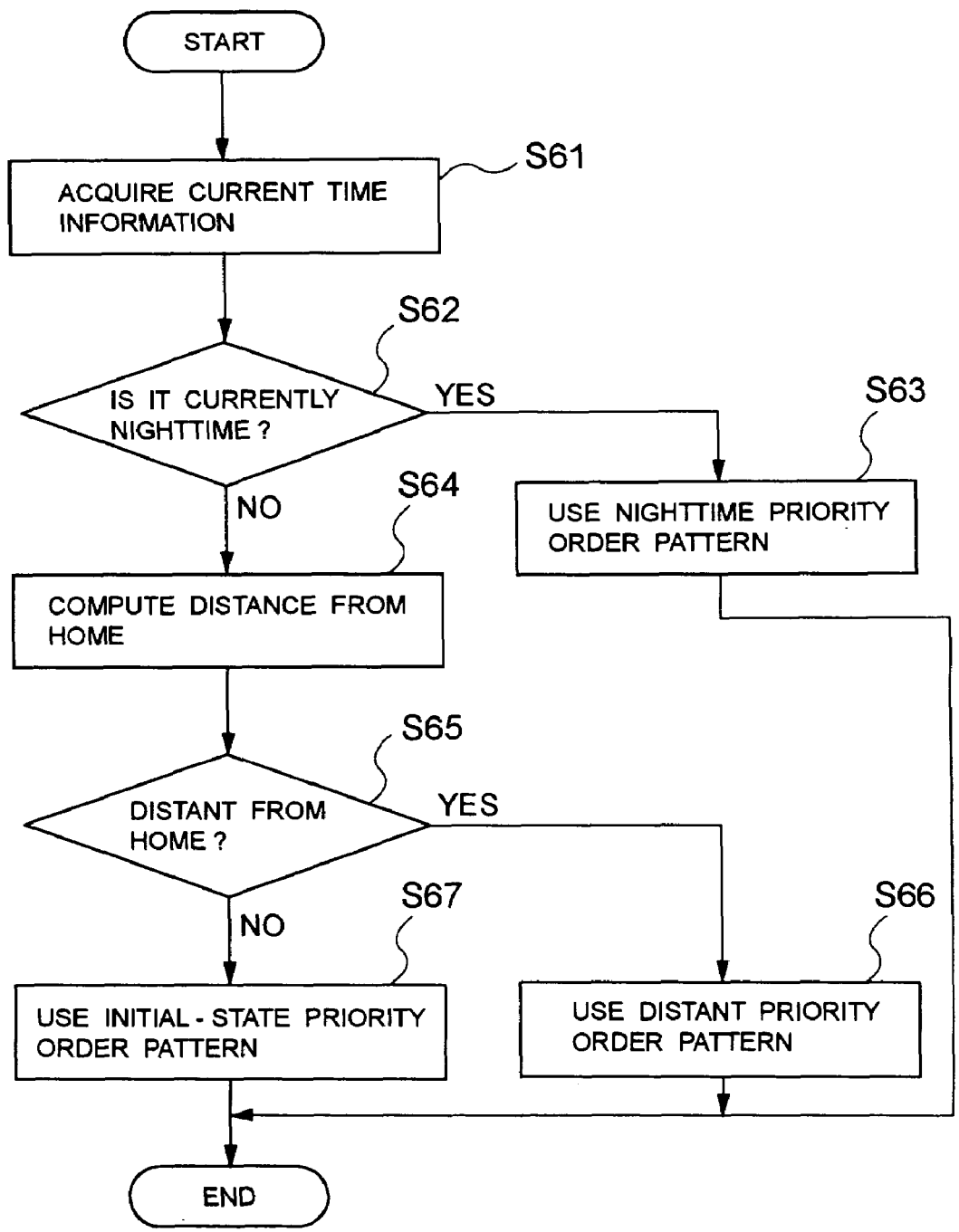
FIG. 12 is a flowchart showing action for automatic priority order pattern selection.

Selection of a priority order pattern can also be performed automatically. For example, FIG. 12 shows automatic priority order pattern selection action to automatically select one pattern, as the priority order pattern, from among an initial-state priority order pattern, a nighttime priority order pattern, and a distant-travel priority order pattern.

In this automatic priority order pattern selection action, the controller 5 acquires current time information from the GPS portion 1 (step S61), and judges whether the current time is nighttime (step S62). If nighttime, settings are made so as to use the priority order indicated by the nighttime priority order pattern in the equipment (step S63). If the current time is not nighttime, the distance from the user's home is calculated (step S64), and a judgment is made as to whether the calculated distance is greater than a prescribed distance, that is, as to whether the current vehicle position is distant from home (step S65). When the current vehicle position is distant from home, the priority order indicated by the distant-travel priority order pattern is set for use in the equipment (step S66). If the current vehicle position is not far from home, the priority order indicated by the initial-state priority order pattern is set for use by the equipment (step S67). This automatic priority order pattern selection action is executed repeatedly.

For example, when the user is unfamiliar with road conditions while on a trip, and so wants to give priority to voice guidance, the system can calculate the distance between the vehicle position and the registered home position, and if the result is a fixed distance or greater, can automatically select a priority order pattern so as to give priority to voice guidance.

Figure 13:
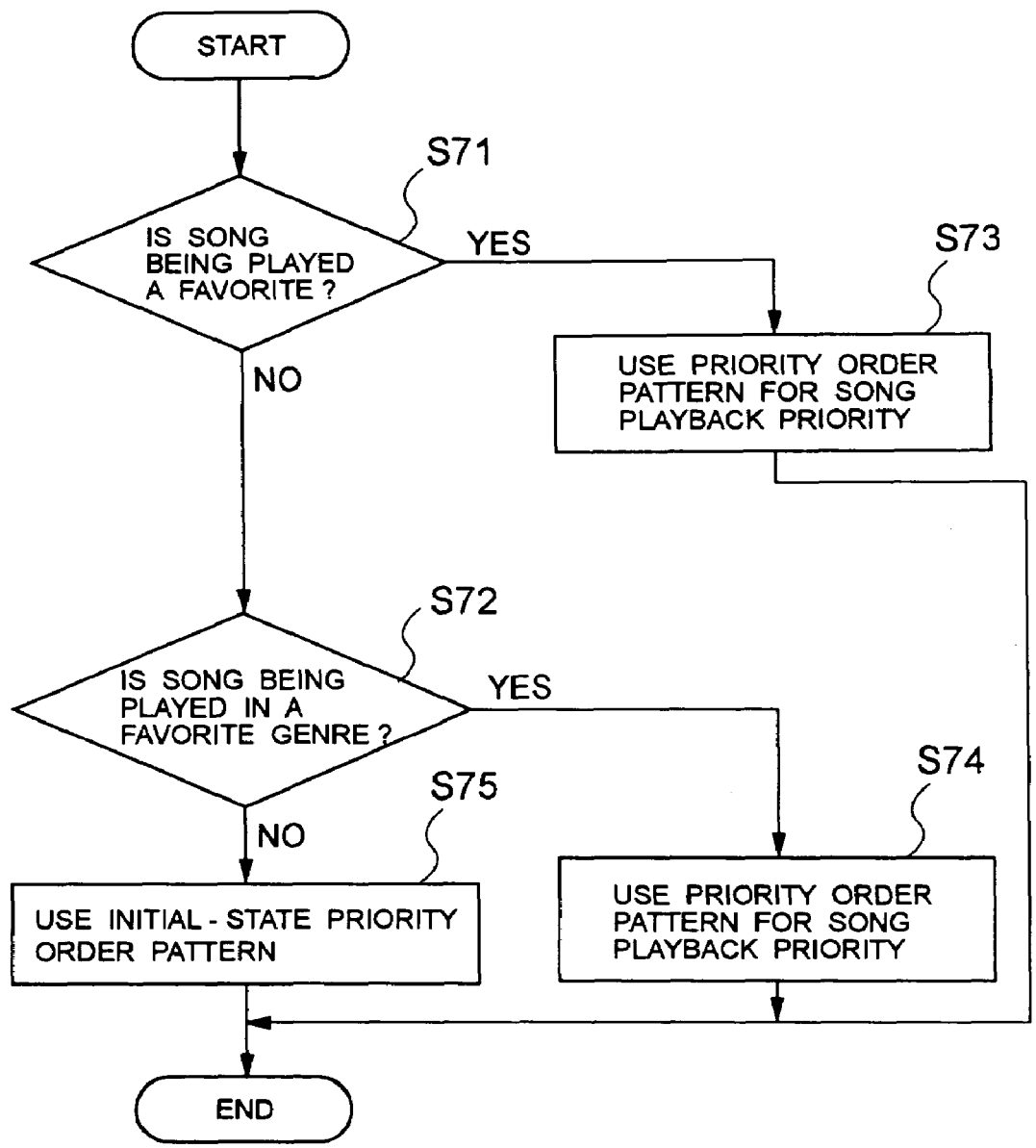
FIG. 13 is a flowchart showing action for automatic priority order pattern selection.

FIG. 13 shows, as automatic priority order pattern selection, the action for automatic selection of one priority order pattern according to the song contents of the song being played. In the action for automatic priority order pattern selection of FIG. 13, the controller 5 judges whether the song being played is a favorite song of the user (step S71). If not a favorite song, a judgment is made as to whether the song being played is a song in a favorite genre of the user (step S72). Each of the plurality of songs stored as song sound data in the music source storage portion 9 is selected in advance by the user as either a favorite, or not a favorite song, and the selection result is stored as data in the music source storage portion 9. With respect to music genres also, selections are made in advance by the user, and this data is stored. This stored data is used in the judgments of steps S71 and S72.

When in step S71 the song being played is judged to be a favorite song, or when in step S72 the song being played is judged to be in a favorite genre, a priority order pattern for song playback priority is selected (steps S73, S74), and the equipment uses the priority order indicated by the priority order pattern for song playback priority. If on the other hand the song being played is judged to be neither a favorite song nor in a favorite genre, the initial-state priority order pattern is selected (step S75), and the priority order indicated by this initial-state priority order pattern is used by the equipment. As a result, even if travel information is generated during the playing of a favorite song or of a song in a favorite genre, the priority given to song playback becomes higher than in the initial state, and so immediate switching from the song playback sound to voice guidance can be avoided.

The action for automatic priority order pattern selection in FIG. 13 may be executed at least once each time the song being played changes.

Figure 14:
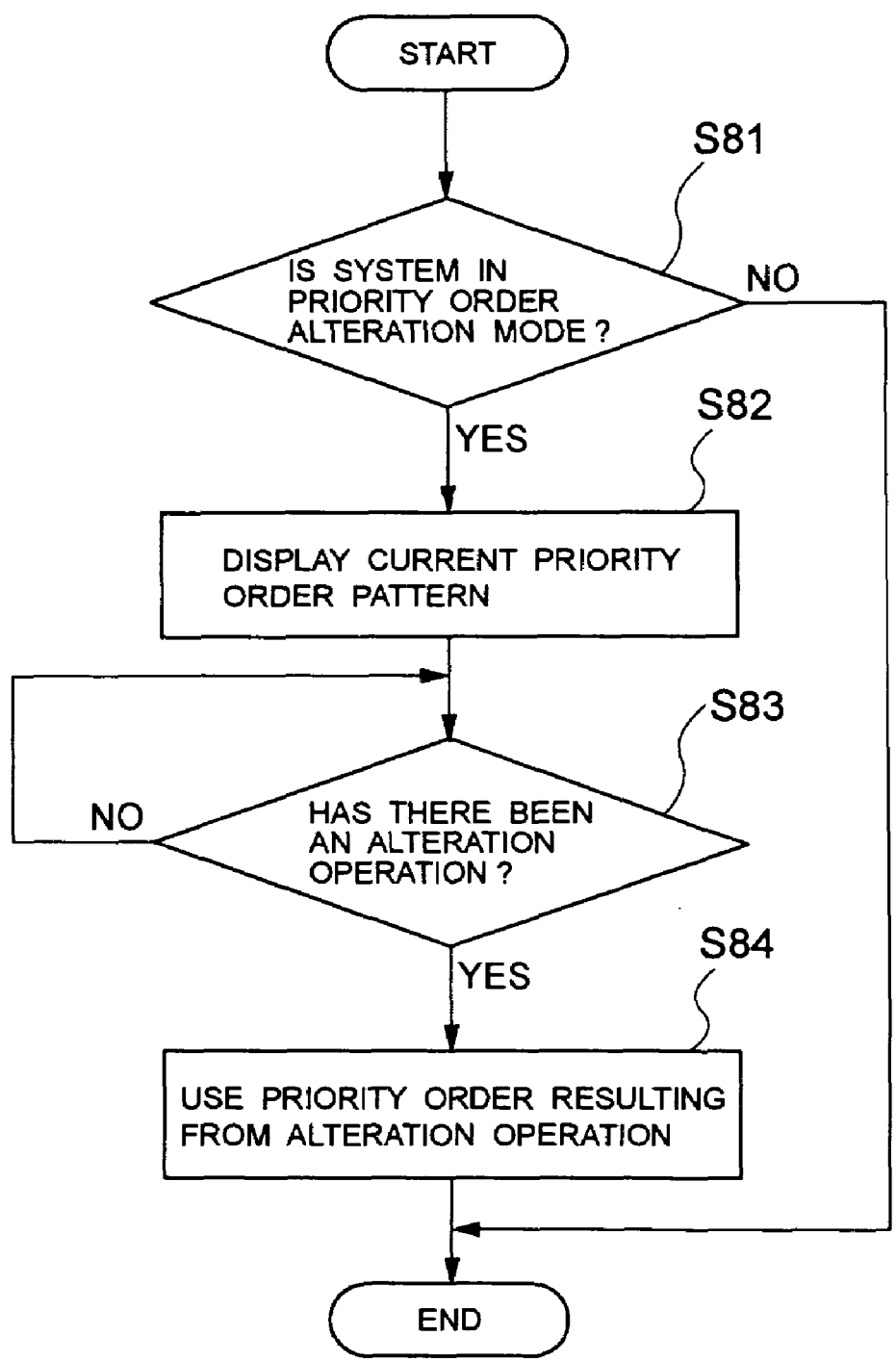
FIG. 14 is a flowchart showing action for priority order modification.

In the actions of the above FIG. 11 through FIG. 13, one pattern is selected from among a plurality of priority order setting patterns, prepared in advance; but the priority order indicated by one priority order pattern may also be altered according to operations by the user. For example, as shown in FIG. 14, the controller 5 judges whether priority order alteration mode has been entered through operation of the operation portion 8 by the user (step S81). If priority order alteration mode has been entered, the controller 5 causes the display portion 7 to display the current priority order for urgencies of travel information and for types of phrases in a song (step S82). The current priority order displayed by the display portion 7 can then be altered by the user through operation of the operation portion 8. Hence travel information urgency which the user would like to change can be changed to an arbitrary level (for example, to any level among high, intermediate, or low). After execution of step S82, the controller 5 judges whether there has been alteration operation (step S83). If there has been alteration operation, the priority order resulting from the alteration operation is set for use by the equipment (step S84).

Figure 15:
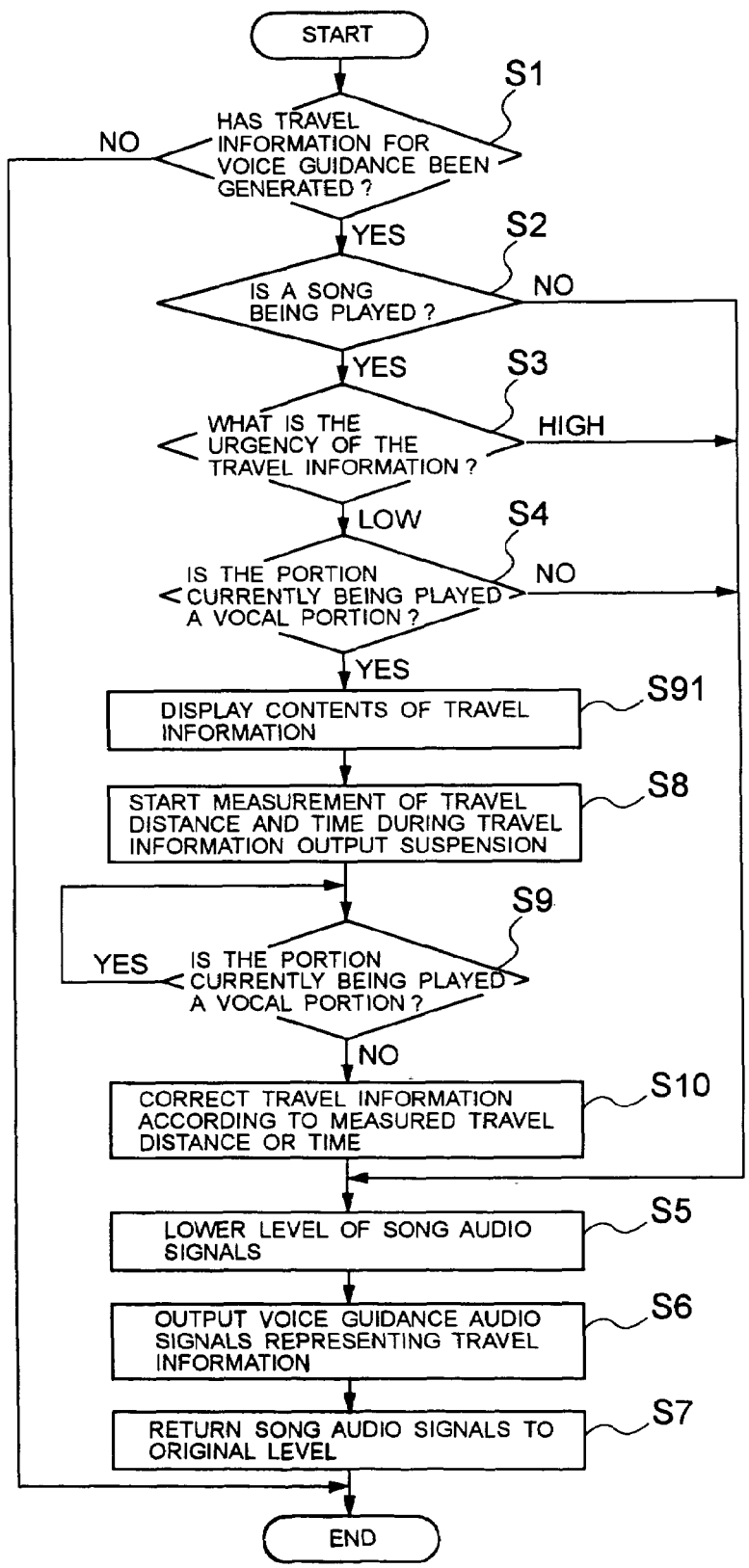
FIG. 15 is a flowchart showing controller action, as another embodiment of this invention.
Figure 16:
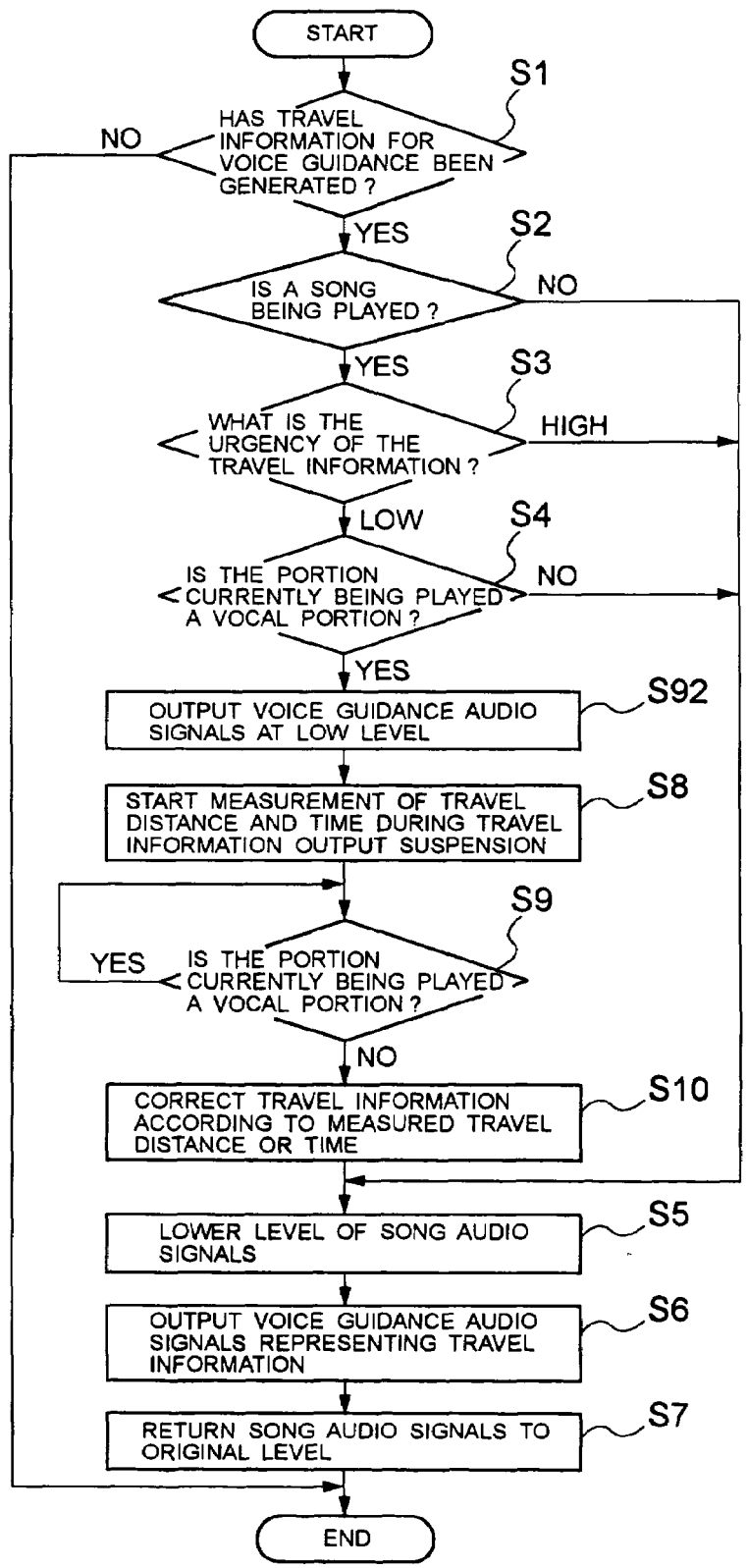
FIG. 16 is a flowchart showing controller action, as another embodiment of this invention.

In each of the above-described embodiments, when the urgency of travel information is low, output of the voice announcement of the travel information is delayed until some time after the time of generation of the travel information. In order to accommodate this delay, as indicated in FIG. 15, when a state of suspension is entered as a result of the judgment of step S4, the contents of the travel information may be caused to be displayed on the display portion 7 (step S91), and thereafter processing may proceed to step S8. Or, as shown in FIG. 16, when a suspension state is entered as a result of the judgment of step S4, the generated travel information may be provided to the voice generation portion 2, the voice announcement audio signal output by the voice generation portion 2 may be caused to be output with the volume lowered (step S92), and thereafter, processing may proceed to step S8. In this way, by either displaying the contents of the travel information or by output of the voice guidance at lower volume while in the state of suspension, the user can be informed of the travel information without delay.

In the above-described embodiments, travel information is information, obtained by the navigation system, relating to guidance on a route to a destination, the velocity of the vehicle, states of operation (states of action) such as headlight checks, and similar; however, traffic information, weather forecasts, or other information necessary for travel received from an external source can also be employed as travel information. For example, traffic information transmitted toward the navigation system from a beacon (light or radio waves), instead of being provided immediately to the user by voice upon being received by the navigation system, can instead be treated similarly to travel information generated by the navigation system itself. That is, in order to avoid interruption of listening during song playback, the information from the beacon can be held temporarily, and then output by voice with appropriate timing so as not to interrupt the song. Information received not only from a beacon, but also by wireless LAN in a hot spot, by broadcast radio waves, or using cellular telephony, may be handled similarly.

FIG. 17 shows examples of travel information with high, intermediate, and low urgency. In addition to travel information from the navigation system, examples of travel information obtained by reception of a beacon, wireless LAN signals, and broadcast radio waves are also shown.

In the above-described embodiments, the navigation system internally comprises an audio playback portion 3; however, this invention can be applied even to vehicle-mounted systems in which the navigation system and audio playback portion are provided separately.

In the above-described embodiments, the equipment is configured such that voice guidance sounds of the navigation system and music playback sounds are output from the same speaker 11; however, a configuration may be employed in which voice guidance sounds and music playback sounds are output from separate speakers.

In the above-described embodiments, song information indicating the start and end times of the introduction, vocal portions, interludes, ending, and chorus portions, as musical phrases in each of a plurality of songs, is created in advance and stored in the song information storage portion 10; however, the song information may be created for each of a plurality of songs according to the song sound data stored in the music source storage portion 9.

In the above-described embodiments, examples of vehicle-mounted navigation systems have been described, but this invention is not limited to such systems, and can be applied to vehicle-mounted information processing devices, portable terminal devices, and other devices having similar functions. Moreover, this invention is not limited to vehicles, but can also be applied to information processing devices for ships and other moving objects.

Figure 18:
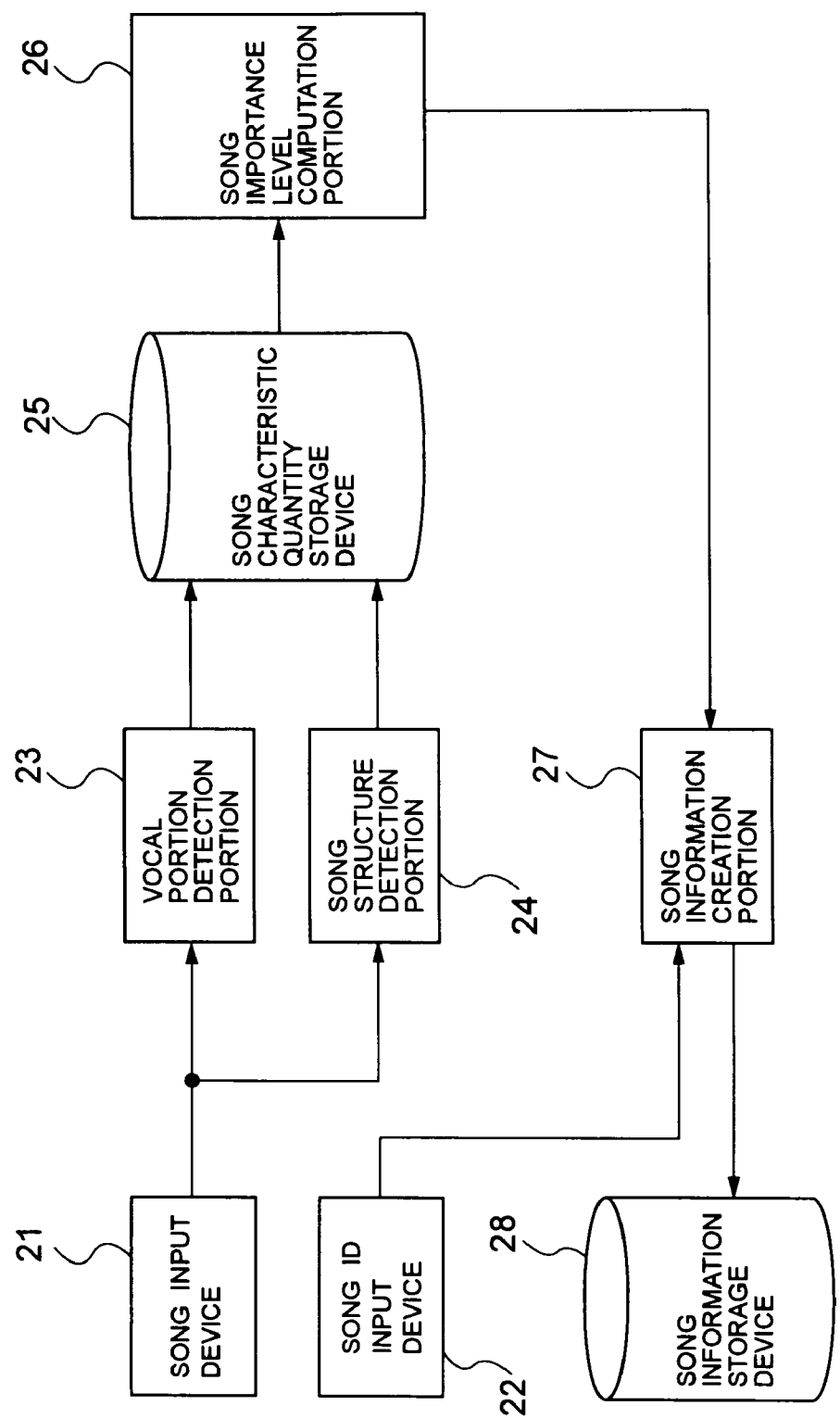
FIG. 18 is a block diagram showing the configuration of a song information creation device.

FIG. 18 shows a song information creation device which creates song information. This song information creation device comprises a song input device 21; song ID input device 22; vocal portion detection portion 23; song structure detection portion 24; song characteristic quantity storage device 25; song importance level computation portion 26; song information creation portion 27; and song information storage device 28.

The song input device 21 is a device which inputs or plays the digital audio signals (for example, PCM data) of a song for which song information is to be created, and may be, for example, a CD player. The output of the song input device 21 is connected to the vocal portion detection portion 23 and song structure detection portion 24. The song ID input device 22 inputs the song name, filename, or other identifying data to identify the song for which song information is to be created. The output of the song ID input device is connected to the song information creation portion 27.

The vocal portion detection portion 23 detects the presence of vocal portions in the song for song information creation. The song structure detection portion 24 detects the repeated structure of the song for song information creation. The detection outputs of both the vocal portion detection portion 23 and the song structure detection portion 24 are connected to the song characteristic quantity storage device 25.

The song characteristic quantity storage device 25 temporarily stores, as song characteristic quantities, the detection results of the vocal portion detection portion 23 and song structure detection portion 24.

The song importance level computation portion 26 uses the song characteristic quantities stored in the song characteristic quantity storage device 25 to determine the importance, whether high, intermediate, or low, of each portion in the structure of a song for song information creation. The computation results of the song importance level computation portion 26 are supplied to the song information creation portion 27.

The song information creation portion 27 creates song information comprising, for each portion of a song for song information creation to which an importance determined by the song importance level computation portion 26 has been assigned, the start and end times, with the song ID input by the song ID input device 22 attached.

The song information storage device 28 stores the song information created by the song information creation portion 27.

In a song information creation device configured in this way, vocal portion detection processing, song structure detection processing, and processing to create and store song information are performed.

As the method for detection of vocal portions based on audio signals representing song sounds, if for example the method of emphasizing centrally positioned signals disclosed in Japanese Patent Kokai No. 2002-247699 (patent reference 1) is employed, then vocal portions can be effectively detected. Below, vocal portion detection processing employing this method is explained.

Figure 19:
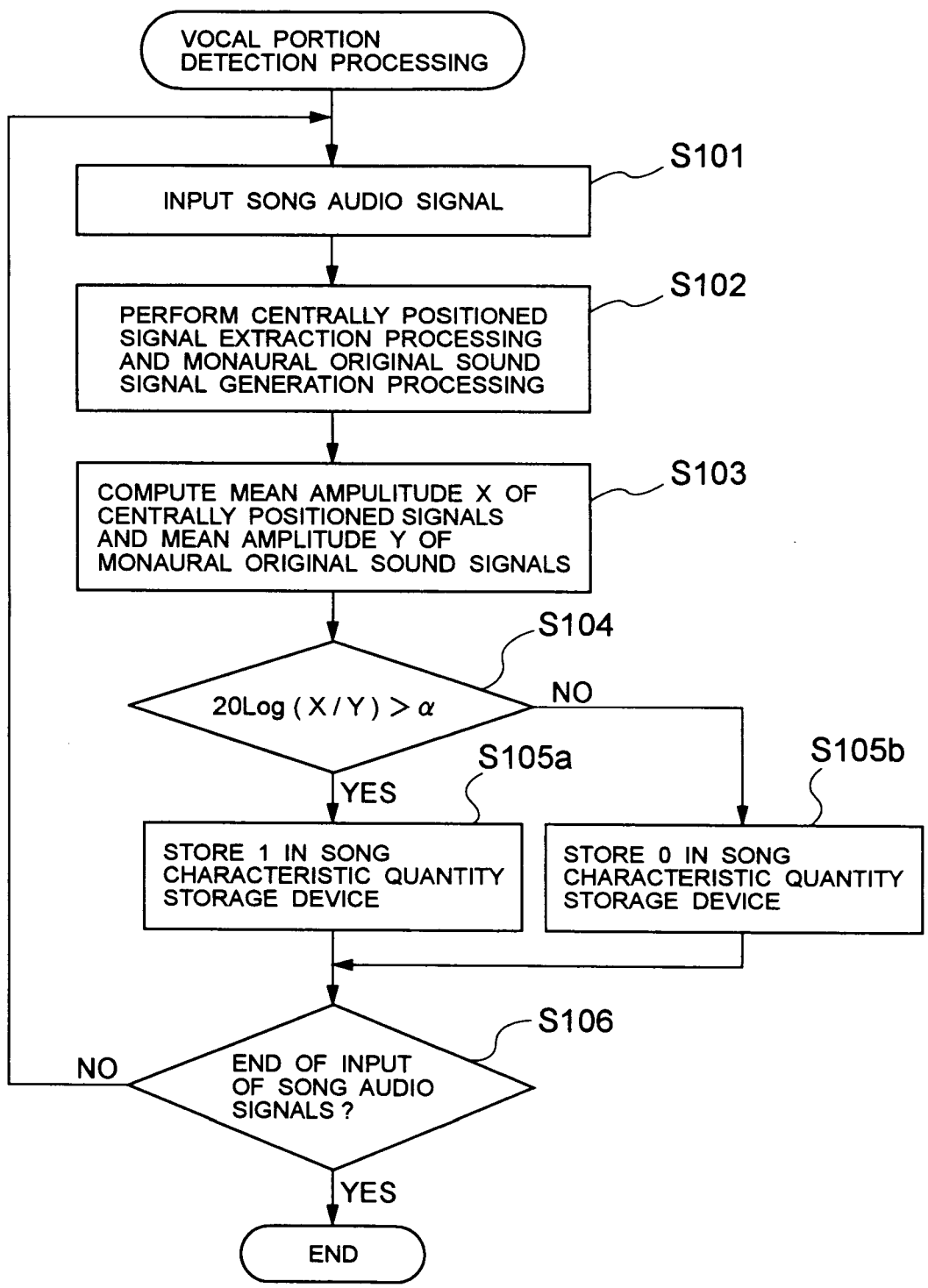
FIG. 19 is a flowchart showing vocal portion detection processing.

In vocal portion detection processing, as shown in FIG. 19, song audio signals (stereo signals) for song information creation are input from the song input device 21 (step S101), and in the vocal portion detection portion 23, processing to extract centrally positioned signals of the stereo signals is performed simultaneously with processing to add the stereo signals to obtain a monaural original sound (step S102). Next, the mean amplitudes X and Y of the centrally positioned signals and monaural original-sound signals computed in step S102 are computed (step S103).

The sound pressure ratio 20log(X/Y) of the mean amplitude X of the centrally positioned signals to the mean amplitude Y of the monaural original-sound signals is then computed, and a judgment is made as to whether the sound pressure ratio is greater than a prescribed value α (step S104). If the computed sound pressure ratio is greater than α, the value 1 is stored in the song characteristic quantity storage device 25 (step S105a); if the computed sound pressure ratio is equal to or less than α, the value 0 is stored in the song characteristic quantity storage device 25 (step S105b). The value of α is a value in the approximate range of −30 to −20. Next, a judgment is made as to whether the input audio signal has ended (step S106), and if the signal has not ended, steps S101 through S106 are repeated. The values stored in the song characteristic quantity storage device 25 are the results of vocal portion detection.

Figure 20:
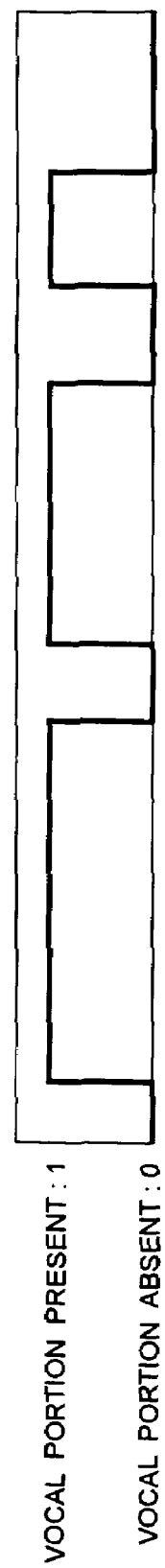
FIG. 20 shows an example of vocal portion detection results for a song comprising vocal portions.
Figure 21:
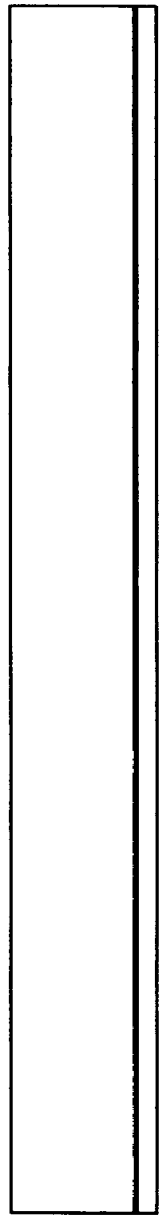
FIG. 21 shows an example of vocal portion detection results for a song not comprising a vocal portion.

FIG. 20 shows an example of the results of vocal portion detection for a song comprising vocal portions; FIG. 21 shows an example of the results of vocal portion detection for a song not comprising a vocal portion.

Next, as a method of detecting song structure according to input audio signals, a "song structure detection device and method" disclosed in Japanese Patent Kokai No. 2002-352865, submitted by the assignee of this application, that is, a method of automatically detecting repeated structures in a song based on chord progressions in songs, can be used.

Figure 22:
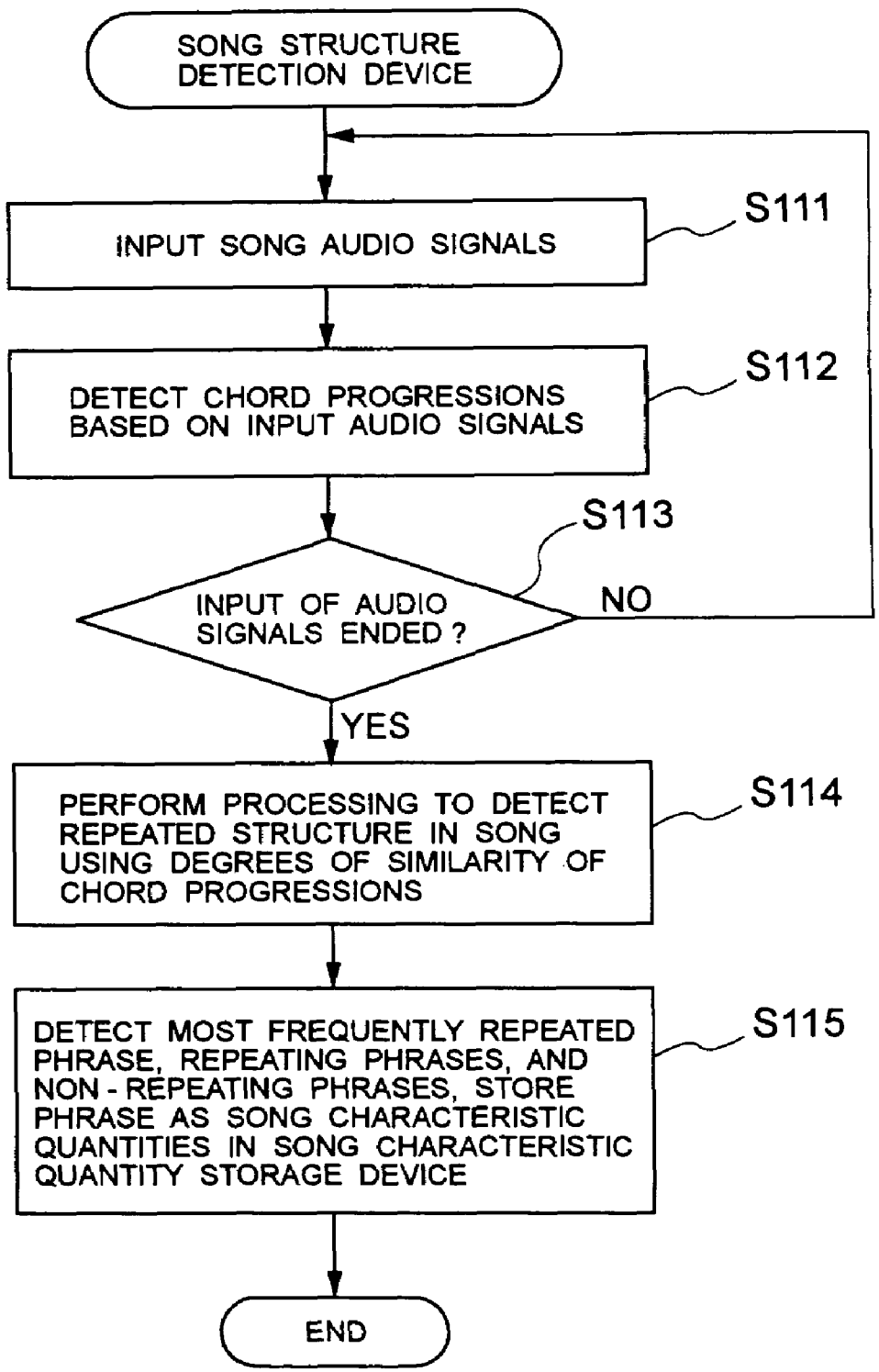
FIG. 22 is a flowchart showing song structure detection processing.

In song structure detection processing, as shown in FIG. 22, audio signals for the song for song information creation are input from the song input device 21 (step S111), and chord progressions are detected according to the audio signals (step S112). A judgment is made as to whether the input audio signals have ended (step S113), and if not ended, steps S111 through S113 are repeated.

Next, processing to detect repeated structures in the song using degrees of similarity of chord progressions is performed (step S114). As a result, the most frequently repeated phrase, repeated phrases, and non-repeated phrases are detected according to the repeated structures obtained, and these phrases are stored, as song characteristic quantities, in the song characteristic quantity storage device 25 (step S115). The phrases stored in the song characteristic quantity storage device 25 are the result of song structure detection.

Figure 23:
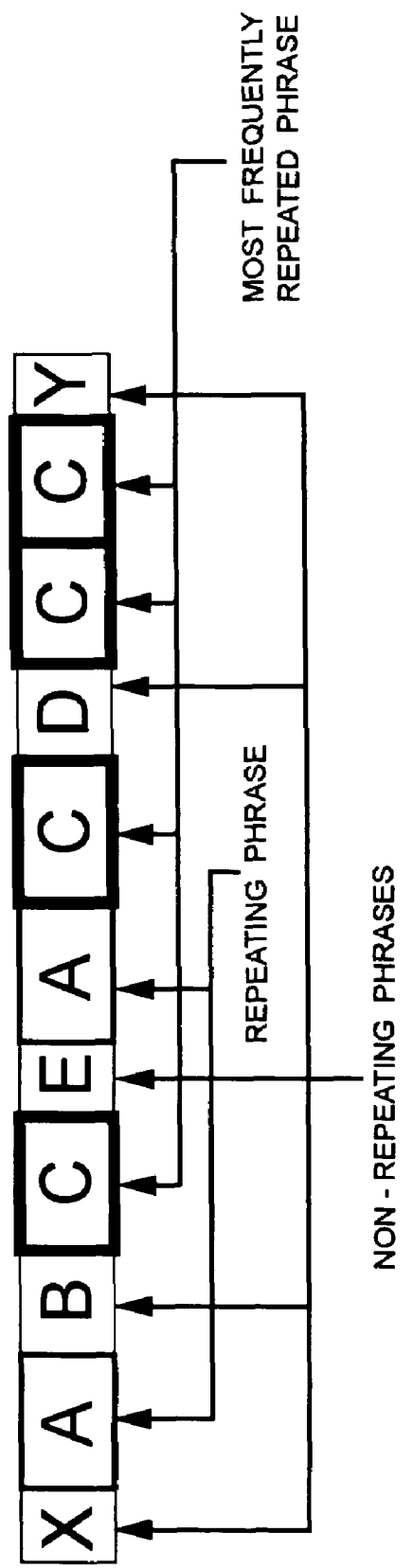
FIG. 23 shows an example of song structure detection results.
Figure 24:
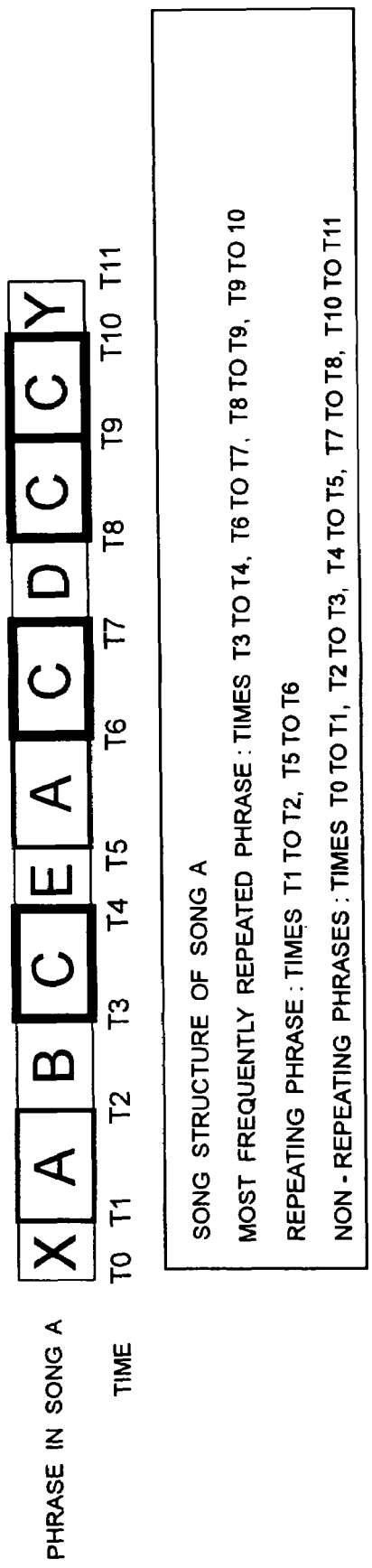
FIG. 24 shows an example of the storage format of song characteristic quantities in a song characteristic quantity storage device, in association with song structure detection results.

FIG. 23 shows an example of the result of song structure detection; FIG. 24 shows an example of the storage format for song characteristic quantities in the song characteristic quantity storage device 25, corresponding to the song structure detection results of FIG. 23.

In song information creation and storage processing, as shown in FIG. 25, vocal portion detection results are read from the song characteristic quantity storage device 25 (step S121), and song structure detection results are read (step S122). Next, a judgment is made as to whether the song for song information creation comprises vocal portions, based on the read-out vocal portion detection results (step S123). If vocal portions are comprised, one phrase is selected from among all the phrases of the song structure detection results, and a judgment is made as to whether this phrase is a vocal portion (step S124); if not a vocal portion, the importance is set to low (step S125). If a vocal portion, a judgment is made as to whether the phrase is the most frequently repeated phrase (step S126), and if the most frequently repeated phrase, the importance is set to high (step S127), but otherwise the importance is set to intermediate (step S128). Then, a judgment is made as to whether selection of all the phrases of the song structure detection results has ended (step S129), and if not ended, processing returns to step S124, and the importance of one phrase is set.

When selection of all phrases of the song structure detection results has ended, the song information creation portion 27 stores the song ID obtained from the song ID input device, and phrases assigned various importance values, in association with start and end times, in the song information storage device 28 (step S130).

FIG. 26 shows an example of importance settings for a song comprising vocal portions; FIG. 27 shows an example of creation of song information corresponding to these importance setting results.

On the other hand, when the judgment of step S123 indicates that no vocal portions are comprised, one phrase is selected from among all the phrases of the song structure detection results, and a judgment is made as to whether this phrase is a repeating phrase (step S131). If not a repeating phrase, the importance is set to low (step S132). If the phrase is a repeating phrase, a judgment is made as to whether the phrase is the most frequently repeated phrase (step S133); if the phrase is the most frequently repeated phrase, the importance is set to high (step S134), and otherwise the importance is set to intermediate (step S135). Thereafter, a judgment is made as to whether selection of all phrases of the song structure detection results has ended (step S136); if selection has not ended, processing returns to step S131, and the importance for the next phrase is set.

When selection of all phrases of the song structure detection results ends, the song information creation portion 27 stores, in the song information storage device 28, the song ID obtained from the song ID input device 22, and phrases with importance values assigned, associated with start and end times (step S137).

FIG. 28 shows an example of importance settings for a song not comprising vocal portions; FIG. 29 shows an example of creation of song information according to these importance setting results.

Song information created in this way is stored in the above-described song information storage portion 10.

In song information creation and storage processing, the importance set for phrases can be compared with the above-described urgency of travel information, and used to determine the priority order of travel information and phrases in songs.

As described above, an information processing device of this invention comprises song playback means to output song audio signals representing song sounds; travel information generation means to generate travel information; song playback judgment means to judge whether, when travel information has been generated, the song playback means is outputting song audio signals; and voice guidance output means to output voice guidance audio signals representing travel information, giving priority over song audio signals, according to at least either one of the urgency of generated travel information and the type of phrase in the song for which song audio signals are currently being output, when it is judged that song audio signals are being output. Hence travel information can be reliably provided through voice guidance, while avoiding insofar as possible the interruption of a user's enjoyment of music during music playback.

This application is based on Japanese patent application No. 2003-408726 which is herein incorporated by reference.

What is claimed is:

1. An information processing device which provides travel information for a moving object through voice guidance, comprising:
    a song playback portion which outputs song audio signals representing song sounds;
    a travel information generation portion which generates said travel information;
    a song playback judgment portion which, when said travel information is generated by said travel information generation portion, judges whether said song playback portion is outputting said song audio signals; and,
    a voice guidance output portion which, when said song playback judgment portion judges that said song audio signals are being output, outputs voice guidance audio signals representing said travel information, giving priority over said song audio signals, according to at least either one of an urgency of said travel information generated, and a type of musical phrase in a song for which said song audio signals are currently being output,
    wherein said voice guidance output portion comprises an urgency judgment portion which judges the urgency of said travel information and a musical phrase type judgment portion which judges the types of musical phrases in the song for which said song audio signals are currently being output.

2. The information processing device according to claim 1, wherein, when said song playback judgment portion judges that said song audio signals are being output, said voice guidance output portion outputs said voice guidance audio signals, giving priority over said song audio signals, when the urgency of said generated travel information is high.

3. The information processing device according to claim 1, wherein, when said song playback judgment portion judges that said song audio signals are being output, and when the type of musical phrase in the song for which said song audio signals are currently being output is other than a vocal portion, even though the urgency of said generated travel information is low, said voice guidance output portion outputs said voice guidance output signals, giving priority over said song audio signals.

4. The information processing device according to claim 1 or claim 3, wherein said voice guidance output portion returns to output of said song audio signals after the priority output of said voice guidance audio signals.

5. The information processing device according to claim 4, wherein, when output is returned to said song audio signals, if the type of musical phrase in the song for which said song audio signals are currently being output is a vocal portion, said voice guidance output portion controls said song playback portion such that said song audio signals are output from a starting signal position of the vocal portion.

6. The information processing device according to claim 4, wherein, when output is returned to said song audio signals, if the type of musical phrase in the song for which said song audio signals are currently being output is a chorus portion, said voice guidance output portion controls said song playback portion such that said song audio signals are output from a starting signal position of the chorus portion.

7. The information processing device according to claim 1, wherein, when said song playback judgment portion judges that said song audio signals are being output, and when the urgency of said generated travel information is low and moreover the type of musical phrase in the song for which said song audio signals are currently being output is a vocal portion, output of said voice guidance audio signals is suspended until the type of musical phrase in the song for which said song audio signals are currently being output changes to other than a vocal portion, and then said voice guidance audio signals are output, giving priority over said song audio signals.

8. The information processing device according to claim 1 or claim 7, wherein
    said voice guidance output portion comprises a measurement portion, which measures the time or the travel distance of said moving object during an interval of suspension of the output of said voice guidance audio signals, and a correction portion, which after the end of said output suspension period corrects the contents of said travel information according to the measurement results of said measurement portion; and,
    voice guidance audio signals representing said travel information after correction by said correction portion, are output giving priority over said song audio signals.

9. The information processing device according to claim 8, wherein
    said voice guidance output portion comprises an excess suspension judgment portion which judges whether an allowable suspension time or an allowable suspension travel distance has been exceeded, according to measurement results of said measurement portion during suspension of the output of said voice guidance audio signals; and, when said excess suspension judgment portion judges that the allowable output suspension interval has been exceeded, said output suspension interval is ended, and voice guidance audio signals representing said travel information after correction by said correction portion are output, giving priority over said song audio signals.

10. The information processing device according to claim 1, wherein, when said song playback judgment portion judges that said song audio signals are being output, if the urgency of said generated travel information is intermediate and moreover if the type of musical phrase in the song for which said song audio signals are currently being output is other than a chorus portion, said voice guidance output portion outputs said voice guidance audio signals, giving priority over said song audio signals.

11. The information processing device according to claim 1, wherein, when said song playback judgment portion judges that said song audio signals are being output, if the urgency of said generated travel information is intermediate and moreover if the type of musical phrase in the song for which said song audio signals are currently being output is a chorus portion, said voice guidance output portion suspends output of said voice guidance audio signals until the type of musical phrase in the song for which said song audio signals are currently being output changes to other than a chorus portion, and then outputs voice guidance audio signals representing said travel information, giving priority over said song audio signals.

12. The information processing device according to claim 1 or claim 11, wherein
    said voice guidance output portion comprises a measurement portion, which measures a time or a travel distance of said moving object during an interval of suspension of the output of said voice guidance audio signals, and a correction portion, which after the end of said output suspension period corrects the contents of said travel information according to the measurement results of said measurement portion; and,
    voice guidance audio signals representing said travel information after correction by said correction portion, are output giving priority over said song audio signals.

13. The information processing device according to claim 12, wherein
    said voice guidance output portion comprises an excess suspension judgment portion which judges whether an allowable suspension time or an allowable suspension travel distance has been exceeded, according to measurement results of said measurement portion during suspension of the output of said voice guidance audio signals; and,
    when said excess suspension judgment portion judges that an allowable output suspension interval has been exceeded, said output suspension interval is ended, and voice guidance audio signals representing said travel information after correction by said correction portion are output, giving priority over said song audio signals.

14. The information processing device according to claim 1, wherein said voice guidance output portion sets an output priority order of each said travel information type and of each said song musical phrase according to the urgency of said travel information and the type of said song musical phrase, and, when said song playback judgment portion judges that said song audio signals are being output, if the priority order of said generated travel information is higher than that of the type of musical phrase in the song for which said song audio signals are currently being output, gives priority to output of said voice guidance audio signals before said song audio signals.

15. The information processing device according to claim 14, wherein said priority order can be altered.

16. The information processing device according to claim 15, wherein said priority order can be altered by an operation to select one pattern from among a plurality of priority order patterns set in advance.

17. The information processing device according to claim 15, wherein said priority order can be altered by automatic selection, according to a user preference for a song being played back, of one pattern from among a plurality of priority order patterns set in advance.

18. The information processing device according to claim 1 or claim 15, wherein a priority order can be altered by automatic selection, according to an action state of said moving object, of one pattern from among a plurality of priority order patterns set in advance.

19. The information processing device according to claim 1, wherein said voice guidance output portion has a display portion which displays the contents of said travel information on a display portion when said song playback judgment portion judges that said song audio signals are being output, until the voice guidance output portion switches to said song audio signals and said voice guidance audio signals are output.

20. The information processing device according to claim 1, wherein, when said song playback judgment portion judges that said song audio signals are being output, said voice guidance output portion switches to said song audio signals, and until said voice guidance audio signals are output, and outputs said voice guidance audio signals whose signal level has been reduced, together with said song audio signals.

21. The information processing device according to claim 1, wherein said travel information comprises the action state of said moving object, guidance over the route of said moving object to a destination, and external information necessary for the travel of said moving object.

22. The information processing device according to claim 1, wherein said travel information generation portion computes said travel information according to the action state of said moving object to generate said travel information.

23. The information processing device according to claim 1, wherein said travel information generation portion generates said travel information by receiving wireless signals from an external source.

24. The information processing device according to claim 1, further comprising a music source storage portion in which are stored song audio signals representing the song sounds of each of a plurality of songs, and wherein said song playback portion selectively outputs song audio signals for one song among said plurality of songs stored in said music source storage portion.

25. The information processing device according to claim 1 or claim 24, further comprising a song information storage portion in which is stored song information indicating intervals of musical phrases in each song of said plurality of songs, and wherein said musical phrase type judgment portion judges the type of musical phrase in the song for which said song audio signals are currently being output according to song information stored in said song information storage portion.

26. The information processing device according to claim 25, having a song information detection portion which automatically detects said song information based on said song audio signals.

27. The information processing device according to claim 26, wherein said song information detection portion comprises a vocal portion detection portion which detects only vocal portions based on said song audio signals; a song structure detection portion which detects chord progressions in a song according to said song audio signals, and detects the song structure according to the pattern of chord progressions; and a song information creation portion which creates said song information according to the vocal portions detected by said vocal portion detection portion and the song structure detected by said song structure detection portion.

28. A travel information voice guidance method, which provides travel information for a moving object by voice guidance, comprising:
   a song playback step of outputting song audio signals representing song sounds;
   a travel information generation step of generating said travel information;
   a song playback judgment step of judging whether, when said travel information is generated in said travel information generation step, said song audio signals are being output in said song playback step; and,
   a voice guidance output step of outputting, when in said song playback judgment step it is judged that said song audio signals are being output, voice guidance audio signals representing said travel information, giving priority over said song audio signals, according to at least either one of an urgency of said travel information generated, and a type of musical phrase in a song for which said song audio signals are currently being output,
   wherein said voice guidance output step comprises an urgency judgment step for judging the urgency of said travel information and a musical phrase type judgment step for judging the types of musical phrases in the song for which said song audio signals are currently being output.

29. A computer-readable medium having a computer program product for execution of a travel information voice guidance method, which provides travel information for a moving object by voice guidance, comprising:
   a song playback step of outputting song audio signals representing song sounds;
   a travel information generation step of generating said travel information;
   a song playback judgment step of judging whether, when said travel information is generated in said travel information generation step, said song audio signals are being output in said song playback step; and,
   a voice guidance output step of outputting, when in said song playback judgment step it is judged that said song audio signals are being output, voice guidance audio signals representing said travel information, giving priority over said song audio signals, according to at least either one of an urgency of said travel information generated, and a type of musical phrase in a song for which said song audio signals are currently being output,
   wherein said voice guidance output step comprises an urgency judgment step for judging the urgency of said travel information and a musical phrase type judgment step for judging the types of musical phrases in the song for which said song audio signals are currently being output.

* * * * *